(12) United States Patent
Akahira et al.

(10) Patent No.: US 6,179,400 B1
(45) Date of Patent: *Jan. 30, 2001

(54) COLOR FILTER MANUFACTURING METHOD AND APPARATUS, COLOR FILTER, DISPLAY DEVICE, APPARATUS HAVING DISPLAY APPARATUS, AND METHOD OF EQUALIZING COLORED STATES OF AREAS

(75) Inventors: Makoto Akahira, Kawasaki; Hiroshi Sato, Yokohama; Hideto Yokoi, Yokohama; Akinori Shiota, Yokohama; Hiromitsu Yamaguchi, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/623,211

(22) Filed: Mar. 28, 1996

(30) Foreign Application Priority Data

Mar. 31, 1995 (JP) .................................................. 7-076577
Mar. 12, 1996 (JP) .................................................. 8-054635

(51) Int. Cl.⁷ .................................................. B41J 2/01
(52) U.S. Cl. .................................................. 347/1
(58) Field of Search .................................. 347/1, 2, 3, 9, 347/43; 427/64, 162, 165, 256; 349/106; 359/891

(56) References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,413,275 * | 11/1983 | Horiuchi et al. | 358/502 |
| 4,446,470 * | 5/1984 | Sugiyama et al. | 347/2 |
| 4,459,600 | 7/1984 | Sato et al. | 346/140 R |
| 4,463,359 | 7/1984 | Avata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,776,671 * | 10/1988 | Sumi et al. | 359/885 |
| 5,093,738 * | 3/1992 | Watanabe et al. | 349/106 |
| 5,353,052 | 10/1994 | Suzuki et al. | 347/19 |
| 5,396,356 * | 3/1995 | Fukuchi | 349/153 |
| 5,670,205 * | 9/1997 | Miyazaki et al. | 427/64 |
| 5,726,724 | 3/1998 | Shirota, et al. | 349/106 |

FOREIGN PATENT DOCUMENTS

| | | |
|---|---|---|
| 0 655 631 | 5/1995 | (EP) . |
| 0 675 385 | 10/1995 | (EP) . |
| 0 683 406 | 11/1995 | (EP) . |
| 0 702 251 | 3/1996 | (EP) . |
| 54-56847 | 5/1979 | (JP) . |
| 59-75205 | 4/1984 | (JP) . |
| 59-123670 | 7/1984 | (JP) . |
| 59-138461 | 8/1984 | (JP) . |
| 60-71260 | 4/1985 | (JP) . |
| 63-235901 | 9/1988 | (JP) . |
| 1-217320 | 8/1989 | (JP) . |
| 1-217302 * | 8/1989 | (JP) . |
| 2-235752 * | 9/1990 | (JP) . |
| 4-261503 | 9/1992 | (JP) . |
| 7-146406 | 6/1995 | (JP) . |
| 7-253510 | 10/1995 | (JP) . |
| 7-318723 | 12/1995 | (JP) . |

* cited by examiner

*Primary Examiner*—Adolf Deneke Berhane
(74) *Attorney, Agent, or Firm*—Fitzpatrick, Cella, Harper & Scinto

(57) ABSTRACT

A color filter manufacturing method colors each of many filter elements partitioned off by many frames formed on a transparent substrate by discharging an ink colored in a predetermined color into each of the frames. In coloring each of the filter elements, a discharging start position of an ink discharged into the frame partitioning off each of the filter elements is changed to color the filter element while changing an amount by which the ink overlaps the frame.

116 Claims, 20 Drawing Sheets

LARGE

DISCHARGED DENSELY

INK DOT 10f
10b
10a 10a
10f

COLOR FILTER MANUFACTURING METHOD AND APPARATUS, COLOR FILTER, DISPLAY DEVICE, APPARATUS HAVING DISPLAY APPARATUS, AND METHOD OF EQUALIZING COLORED STATES OF AREAS

BACKGROUND OF THE INVENTION

1. Field of the Invention

The present invention relates to a method and apparatus for manufacturing a color filter by forming and arranging a large number of colored filter elements on a transparent substrate, the color filter, a display apparatus, an apparatus having the display apparatus, and a method of equalizing the colored states of areas.

2. Description of the Related Art

With recent advances in personal computers, especially portable personal computers, the demand tends to arise for liquid crystal displays, especially color liquid crystal displays. However, in order to further popularize the use of liquid crystal displays, a reduction in cost must be achieved. Especially, it is required to reduce the cost of a color filter which occupies a large proportion of the total cost. Various methods have been tried to satisfy the required characteristics of color filters while meeting the above requirements. However, any method capable of satisfying all the requirements has not been established. The respective methods will be described below.

The first method is a dyeing method, which is the most popular method. In the dyeing method, a water-soluble polymer material as a dyeable material is coated on a glass substrate, and the coating is patterned into a desired shape by a photolithography process. The obtained pattern is dipped in a dye bath to obtain a colored pattern. This process is repeated three times to form R, G, and B color filter layers.

The second method is a pigment dispersion method, which is currently replacing the dyeing method. In this method, a pigment-dispersed photosensitive resin layer is formed on a substrate and patterned into a single-color pattern. This process is repeated three times to obtain R, G, and B color filter layers.

The third method is an electrodeposition method. In this method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

The fourth method is a print method. In this method, a pigment is dispersed in a thermosetting resin, a print operation is performed three times to form R, G, and B coatings separately, and the resins are thermoset, thereby forming colored layers. In either of the above methods, a protective layer is generally formed on the colored layers.

The point common to these methods is that the same process must be repeated three times to obtain layers colored in three colors, i.e., R, G, and B. This causes an increase in cost. In addition, as the number of processes increases, the yield decreases. In the electrodeposition method, limitations are imposed on pattern shapes which can be formed. For this reason, with the existing techniques, this method cannot be applied to TFTs. In the print method, a pattern with a fine pitch cannot be formed because of poor resolution and poor evenness.

In order to eliminate these drawbacks, methods of manufacturing color filters by an ink-jet system are disclosed in Japanese Patent Laid-Open Nos. 59-75205, 63-235901, and 1-217320. In these methods, coloring solutions containing coloring agents of three colors, i.e., R (red), G (green), and B (blue), are sprayed on a transparent substrate by an ink-jet system, and the respective coloring solutions are dried to form colored image portions. In such an ink-jet system, R, G, and B filter elements (pixels) can be formed at once, allowing great simplification of the manufacturing process and a great reduction in cost.

In the above conventional manufacturing methods based on the ink-jet system, however, it is difficult to discharge a required amount of ink for one filter element (one pixel) at once and uniformly spread the ink on the entire surface of each opening portion of a black matrix for partitioning off each filter element. In addition, each discharged ink dot has an almost circular shape, and a plurality of ink dots must be discharged onto each rectangular opening portion of the black matrix. In this case, it is difficult to uniformly spread the ink on the entire surface of each opening portion of the black matrix by using a method of uniformly discharging an ink. Color omissions occur sometimes at peripheral portions of an opening portion. A color omission is a serious defect for a color filter, and causes a great deterioration in image quality. If a considerably larger dot is formed on an opening portion of a black matrix in order to prevent such an inconvenience, the dot may mix with a dot of another color in an adjacent opening portion. In order to solve this problem, various proposals associated an improvement in the properties of inks and reception layers have been made.

The experiment conducted by the present applicant shows that the behavior of inks after impact greatly varies depending on the characteristics of red (R), green (G), and blue (B) inks and the like. That is, only with an improvement in the properties of inks and reception layers, it is difficult to manufacture a color filter without color irregularity by using an ink-jet system. As described above, an ink discharging method and discharging amount are important factors in manufacturing a color filter.

SUMMARY OF THE INVENTION

The present invention has been made in consideration of the above situation, and has as its first object to provide a method and apparatus for manufacturing a color filter having excellent color irregularity characteristics without any color omission, color mixture, and the like, and a method of equalizing the colored states of areas.

It is the second object of the present invention to provide a color filter having excellent color irregularity characteristics without any color omission, color mixture, and the like, a display apparatus using the color filter, and an apparatus having the display apparatus.

In order to solve the above problems and achieve the above objects, a color filter manufacturing method of the present invention is characterized by the following process according to its first aspect.

There is provided a color filter manufacturing method of coloring each of many filter elements partitioned off by many frames formed on a transparent substrate by discharging an ink colored in a predetermined color into each of the frames, thereby manufacturing a color filter, comprising, in coloring each of the filter elements, changing a discharging start position of an ink discharged into the frame partitioning off each of the filter elements to color the filter element while changing an amount by which the ink overlaps the frame.

A color filter manufacturing method of the present invention is characterized by the following process according to its second aspect.

There is provided a color filter manufacturing method of coloring each of many filter elements partitioned off by many frames formed on a transparent substrate by discharging an ink colored in a predetermined color into each of the frames, thereby manufacturing a color filter, comprising decreasing intervals between inks, discharged in an overlapping state, at a last stage of a discharging process in coloring each of the filter elements, when a plurality of inks are to be shifted and discharged, in an overlapping state, into the frame partitioning off each of the filter elements.

A color filter manufacturing method of the present invention is characterized by the following process according to its third aspect.

There is provided a color filter manufacturing method of coloring each of many filter elements partitioned off by many frames formed on a transparent substrate by discharging an ink colored in a predetermined color into each of the frames, thereby manufacturing a color filter, comprising changing the number of inks, to be discharged in an overlapping state, in accordance with an amount of ink discharged in coloring each of the filter elements, when a plurality of inks are to be shifted and discharged, in an overlapping state, into the frame partitioning off each of the filter elements.

A color filter manufacturing method of the present invention is characterized by the following process according to its fourth aspect.

There is provided a color filter manufacturing method of coloring each of many filter elements partitioned off by many frames formed on a transparent substrate by discharging an ink colored in a predetermined color into each of the frames, thereby manufacturing a color filter, comprising setting amounts of ink, discharged in an overlapping state, to be different in units of inks in coloring each of the filter elements, when a plurality of inks are to be shifted and discharged, in an overlapping state, into the frame partitioning off each of the filter elements.

A color filter manufacturing apparatus of the present invention is characterized by the following arrangement according to its first aspect.

There is provided a color filter manufacturing apparatus for coloring each of many filter elements partitioned off by many frames formed on a transparent substrate by discharging an ink colored in a predetermined color into each of the frames, thereby manufacturing a color filter, comprising discharge means for discharging a colored ink onto the substrate, moving means for moving relative positions of the discharging means and the substrate, and control means for, when each of the filter elements is to be colored, controlling the moving means and the discharge means to change an amount by which the ink overlaps the frame by changing a discharging start position of the ink discharged into the frame partitioning off each of the filter elements.

A color filter manufacturing apparatus of the present invention is characterized by the following arrangement according to its second aspect.

There is provided a color filter manufacturing apparatus for coloring each of many filter elements partitioned off by many frames formed on a transparent substrate by discharging an ink colored in a predetermined color into each of the frames, thereby manufacturing a color filter, comprising discharge means for discharging a colored ink onto the substrate, moving means for moving relative positions of the discharging means and the substrate, and control means for, when each of the filter elements is to be colored, controlling the moving means and the discharge means to shift and discharge a plurality of inks, in an overlapping state, into the frame partitioning off each of the filter elements such that intervals between inks discharged in an overlapping state is decreased at a last stage of a discharging process.

A color filter manufacturing apparatus of the present invention is characterized by the following arrangement according to its third aspect.

There is provided a color filter manufacturing apparatus for coloring each of many filter elements partitioned off by many frames formed on a transparent substrate by discharging an ink colored in a predetermined color into each of the frames, thereby manufacturing a color filter, comprising discharge means for discharging a colored ink onto the substrate, moving means for moving relative positions of the discharging means and the substrate, and control means for, when each of the filter elements is to be colored, controlling the moving means and the discharge means to shift and discharge a plurality of inks, in an overlapping state, into the frame partitioning off each of the filter elements such that the number of inks discharged in an overlapping state is changed in accordance with an amount of the ink discharged.

A color filter manufacturing apparatus of the present invention is characterized by the following arrangement according to its fourth aspect.

There is provided a color filter manufacturing apparatus for coloring each of many filter elements partitioned off by many frames formed on a transparent substrate by discharging an ink colored in a predetermined color into each of the frames, thereby manufacturing a color filter, comprising discharge means for discharging a colored ink onto the substrate, moving means for moving relative positions of the discharging means and the substrate, and control means for, when each of the filter elements is to be colored, controlling the moving means and the discharge means to shift and discharge a plurality of inks, in an overlapping state, into the frame partitioning off each of the filter elements such that amounts of inks discharged in an overlapping state are set to be different in units of inks.

A color filter of the present invention is characterized by the following arrangement according to its first aspect.

There is provided a color filter manufactured by coloring each of many filter elements partitioned off by many frames formed on a transparent substrate by discharging an ink colored in a predetermined color into each of the frames, wherein in coloring each of the filter elements, a discharging start position of an ink discharged into the frame partitioning off each of the filter elements is changed to color the filter element while changing an amount by which the ink overlaps the frame.

A color filter of the present invention is characterized by the following arrangement according to its second aspect.

There is provided a color filter manufactured by coloring each of many filter elements partitioned off by many frames formed on a transparent substrate by discharging an ink colored in a predetermined color into each of the frames, wherein in coloring each of the filter elements, when a plurality of inks are to be shifted and discharged, in an overlapping state, into the frame partitioning off each of the filter elements, intervals between inks discharged in an overlapping state are decreased at a last stage of a discharging process.

A color filter of the present invention is characterized by the following arrangement according to its third aspect.

There is provided a color filter manufactured by coloring each of many filter elements partitioned off by many frames formed on a transparent substrate by discharging an ink colored in a predetermined color into each of the frames, wherein in coloring each of the filter elements, when a plurality of inks are to be shifted and discharged, in an overlapping state, into the frame partitioning off each of the filter elements, the number of inks to be discharged in an overlapping state is changed in accordance with an amount of ink discharged.

A color filter of the present invention is characterized by the following arrangement according to its fourth aspect.

There is provided a color filter manufactured by coloring each of many filter elements partitioned off by many frames formed on a transparent substrate by discharging an ink colored in a predetermined color into each of the frames, wherein in coloring each of the filter elements, when a plurality of inks are to be shifted and discharged, in an overlapping state, into the frame partitioning off each of the filter elements, amounts of ink discharged in an overlapping state are set to be different in units of inks.

A display apparatus of the present invention is characterized by the following arrangement according to its first aspect.

There is provided a display apparatus using a color filter manufactured by coloring each of many filter elements partitioned off by many frames formed on a transparent substrate by discharging an ink colored in a predetermined color into each of the frames, integrally comprising a color filter having filter elements each colored such that a discharging start position of an ink discharged into the frame partitioning off each of the filter elements is changed to change an amount by which the ink overlaps the frame, and light amount changing means for changing an amount of light.

A display apparatus of the present invention is characterized by the following arrangement according to its second aspect.

There is provided a display apparatus using a color filter manufactured by coloring each of many filter elements partitioned off by many frames formed on a transparent substrate by discharging an ink colored in a predetermined color into each of the frames, integrally comprising a color filter having filter elements each colored such that when a plurality of inks are to be shifted and discharged, in an overlapping state, into the frame partitioning off each of the filter elements, intervals between inks discharged in an overlapping state are decreased at a last stage of a discharging process, and light amount changing means for changing an amount of light.

A display apparatus of the present invention is characterized by the following arrangement according to its third aspect.

There is provided a display apparatus using a color filter manufactured by coloring each of many filter elements partitioned off by many frames formed on a transparent substrate by discharging an ink colored in a predetermined color into each of the frames, integrally comprising a color filter having filter elements each colored such that when a plurality of inks are to be shifted and discharged, in an overlapping state, into the frame partitioning off each of the filter elements, the number of inks to be discharged in an overlapping state is changed in accordance with an amount of ink discharged, and light amount changing means for changing an amount of light.

A display apparatus of the present invention is characterized by the following arrangement according to its fourth aspect.

There is provided a display apparatus using a color filter manufactured by coloring each of many filter elements partitioned off by many frames formed on a transparent substrate by discharging an ink colored in a predetermined color into each of the frames, integrally comprising a color filter having filter elements each colored such that when a plurality of inks are to be shifted and discharged, in an overlapping state, into the frame partitioning off each of the filter elements, amounts of ink discharged in an overlapping state are set to be different in units of inks, and light amount changing means for changing an amount of light.

An apparatus including a display apparatus of the present invention is characterized by the following arrangement according to its first aspect.

There is provided an apparatus including a display apparatus having a color filter manufactured by coloring each of many filter elements partitioned off by many frames formed on a transparent substrate by discharging an ink colored in a predetermined color into each of the frames, comprising a display apparatus integrally incorporating a color filter having filter elements each colored such that a discharging start position of an ink discharged into the frame partitioning off each of the filter elements is changed to change an amount by which the ink overlaps the frame, and light amount changing means for changing an amount of light, and image signal output means for outputting an image signal to the display apparatus.

An apparatus including a display apparatus of the present invention is characterized by the following arrangement according to its second aspect.

There is provided an apparatus including a display apparatus having a color filter manufactured by coloring each of many filter elements partitioned off by many frames formed on a transparent substrate by discharging an ink colored in a predetermined color into each of the frames, comprising a display apparatus integrally incorporating a color filter having filter elements each colored such that when a plurality of inks are to be shifted and discharged, in an overlapping state, into the frame partitioning off each of the filter elements, intervals between inks discharged in an overlapping state are decreased at a last stage of a discharging process, and light amount changing means for changing an amount of light, and image signal output means for outputting an image signal to the display apparatus.

An apparatus including a display apparatus of the present invention is characterized by the following arrangement according to its third aspect.

There is provided an apparatus including a display apparatus having a color filter manufactured by coloring each of many filter elements partitioned off by many frames formed on a transparent substrate by discharging an ink colored in a predetermined color into each of the frames, comprising a display apparatus integrally incorporating a color filter having filter elements each colored such that when a plurality of inks are to be shifted and discharged, in an overlapping state, into the frame partitioning off each of the filter elements, the number of inks to be discharged in an overlapping state is changed in accordance with an amount of ink discharged, and light amount changing means for changing an amount of light, and image signal output means for outputting an image signal to the display apparatus.

An apparatus including a display apparatus of the present invention is characterized by the following arrangement according to its fourth aspect.

There is provided an apparatus including a display apparatus having a color filter manufactured by coloring each of many filter elements partitioned off by many frames formed on a transparent substrate by discharging an ink colored in a predetermined color into each of the frames, comprising a display apparatus integrally incorporating a color filter having filter elements each colored such that when a plurality of inks are to be shifted and discharged, in an overlapping state, into the frame partitioning off each of the filter elements, amounts of ink discharged in an overlapping state are set to be different in units of inks, and light amount changing means for changing an amount of light, and image signal output means for outputting an image signal to the display apparatus.

A display apparatus of the present invention is characterized by the following arrangement according to its fifth aspect.

There is provided a display apparatus using a color filter manufactured by coloring each of many filter elements partitioned off by many frames formed on a transparent substrate by discharging an ink colored in a predetermined color into each of the frames, integrally comprising a color filter having substantially no density irregularity which visually exists at central and peripheral portions of the frame, and light amount changing means for changing an amount of light.

An apparatus including a display apparatus of the present invention is characterized by the following arrangement according to its fifth aspect.

There is provided an apparatus including a display apparatus having a color filter manufactured by coloring each of many filter elements partitioned off by many frames formed on a transparent substrate by discharging an ink colored in a predetermined color into each of the frames, comprising a display apparatus integrally incorporating a color filter having substantially no density irregularity which visually exists at central and peripheral portions of the frame, and light amount changing means for changing an amount of light, and image signal output means for outputting an image signal to the display apparatus.

A color filter manufacturing method of the present invention is characterized by the following process according to its fifth aspect.

There is provided a color filter manufacturing method of manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising coloring the filter elements arranged in the scanning direction while an amount by which the ink overlaps each of the frames is changed by changing a discharging start position of the ink discharged into the frame at the start of the scanning operation.

A color filter manufacturing method of the present invention is characterized by the following process according to its sixth aspect.

There is provided a color filter manufacturing method of manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising decreasing intervals between ink, discharged in an overlapping state, at a last stage of a scanning operation.

A color filter manufacturing method of the present invention is characterized by the following process according to its seventh aspect.

There is provided a color filter manufacturing method of manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising changing the number of inks, discharged in an overlapping state, in accordance with an amount of ink discharged.

A color filter manufacturing method of the present invention is characterized by the following process according to its eighth aspect.

There is provided a color filter manufacturing method of manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising setting amounts of inks, discharged in an overlapping state, to be different in units of inks.

A color filter manufacturing apparatus of the present invention is characterized by the following arrangement according to its fifth aspect.

There is provided a color filter manufacturing apparatus for manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising moving means for moving relative positions of the ink-jet head and the substrate, and control means for controlling the moving means and the ink-jet head such that an amount by which the ink overlap the frame is changed by changing a discharging start position of the ink discharged into the frame at the start of the scanning operation.

A color filter manufacturing apparatus of the present invention is characterized by the following arrangement according to its sixth aspect.

There is provided a color filter manufacturing apparatus for manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising moving means for moving relative positions of the ink-jet head and the substrate, and control means for controlling the moving means and the ink-jet head to decrease intervals between inks discharged in an overlapping state at a last stage of the scanning operation.

A color filter manufacturing apparatus of the present invention is characterized by the following apparatus according to its seventh aspect.

There is provided a color filter manufacturing apparatus for manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising moving means for moving relative positions of the ink-jet head and the substrate, and control means for controlling the moving means and the ink-jet head to set amounts of inks discharged in an overlapping state to be different in units of inks.

A color filter manufacturing apparatus of the present invention is characterized by the following apparatus according to its eighth aspect.

There is provided a color filter manufacturing apparatus for manufacturing a color filter by discharging an ink while scanning, with an ink-jet head, a transparent substrate on which many frames for partitioning off many filter elements are formed, and continuously coloring portions inside and outside the frames arranged in a scanning direction of the ink-jet head, comprising moving means for moving relative positions of the ink-jet head and the substrate, and control means for controlling the moving means and the ink-jet head to set amounts of inks discharged in an overlapping state to be different in units of inks.

A color filter of the present invention is characterized by the following arrangement according to its fifth aspect.

There is provided a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, wherein the filter elements arranged in the scanning direction are colored while an amount by which the ink overlaps each of the frames is changed by changing a discharging start position of the ink discharged into the frame at the start of the scanning operation.

A color filter of the present invention is characterized by the following arrangement according to its sixth aspect.

There is provided a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, wherein intervals between ink discharged in an overlapping state are decreased at a last stage of a scanning operation.

A color filter of the present invention is characterized by the following arrangement according to its seventh aspect.

There is provided a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, wherein the number of inks discharged in an overlapping state is changed in accordance with an amount of ink discharged.

A color filter of the present invention is characterized by the following arrangement according to its eighth aspect.

There is provided a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, wherein amounts of inks discharged in an overlapping state are set to be different in units of inks.

A display apparatus of the present invention is characterized by the following arrangement according to its sixth aspect.

There is provided a display apparatus using a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, integrally comprising a color filter manufactured by coloring filter elements arranged in the scanning direction while an amount by which the ink overlaps each of the frames is changed by changing a discharging start position of the ink discharged into the frame at the start of the scanning operation, and light amount changing means for changing an amount of light.

A display apparatus of the present invention is characterized by the following arrangement according to its seventh aspect.

There is provided a display apparatus using a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, integrally comprising a color filter colored while intervals between ink discharged in an overlapping state are decreased at a last stage of a scanning operation, and light amount changing means for changing an amount of light.

A display apparatus of the present invention is characterized by the following arrangement according to its eighth aspect.

There is provided a display apparatus using a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, integrally comprising a color filter colored while the number of inks discharged in an overlapping state is changed in accordance with an amount of ink discharged, and light amount changing means for changing an amount of light.

A display apparatus of the present invention is characterized by the following arrangement according to its ninth aspect.

There is provided a display apparatus using a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, integrally comprising a color filter while amounts of inks discharged in an overlapping state are set to be different in units of inks, and light amount changing means for changing an amount of light.

An apparatus including a display apparatus of the present invention is characterized by the following arrangement according to its sixth aspect.

There is provided an apparatus including a display apparatus having a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, comprising a display apparatus integrally incorporating a color filter manufactured by coloring filter elements arranged in the scanning direction while an amount by which the ink overlaps each of the frames is changed by changing a discharging start position of the ink discharged into the frame at the start of the scanning operation, and light amount changing means for changing an amount of light, and image signal output means for outputting an image signal to the display apparatus.

An apparatus including a display apparatus of the present invention is characterized by the following arrangement according to its seventh aspect.

There is provided an apparatus including a display apparatus having a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, comprising a display apparatus integrally incorporating a color filter colored while intervals between ink discharged in an overlapping state are decreased at a last stage of a scanning operation, and light amount changing means for changing an amount of light, and image signal output means for outputting an image signal to the display apparatus.

An apparatus including a display apparatus of the present invention is characterized by the following arrangement according to its eighth aspect.

There is provided an apparatus including a display apparatus having a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, comprising a display apparatus integrally incorporating a color filter colored while the number of inks discharged in an overlapping state is changed in accordance with an amount of ink discharged, and light amount changing means for changing an amount of light, and image signal output means for outputting an image signal to the display apparatus.

An apparatus including a display apparatus of the present invention is characterized by the following arrangement according to its ninth aspect.

There is provided an apparatus including a display apparatus having a color filter manufactured by discharging an ink while scanning, with an ink-jet head, a transparent substrate on which many frames for partitioning off many filter elements are formed, and continuously coloring portions inside and outside the frames arranged in a scanning direction of the ink-jet head, comprising a display apparatus integrally incorporating a color filter while amounts of inks discharged in an overlapping state are set to be different in units of inks, and light amount changing means for changing an amount of light, image signal output means for outputting an image signal to the display apparatus.

A color filter manufacturing method of the present invention is characterized by the following process according to its ninth aspect.

There is provided a method of manufacturing a color filter by discharging an ink onto a substrate to perform a coloring operation while scanning the substrate with an ink-jet head, comprising changing a method of discharging the ink from the ink-jet head for each area in a filter element unit which is located on the substrate, includes at least one filter element, and extends in a scanning direction so as to equalize color irregularity in the filter element unit.

A method of equalizing colored states of areas of the present invention is characterized by the following process according to its first aspect.

There is provided a method of equalizing colored states of areas on a substrate in manufacturing a color filter by discharging an ink onto the substrate to perform a coloring operation while scanning the substrate with an ink-jet head, comprising changing a method of discharging the ink from the ink-jet head for each area in a filter element unit which is located on the substrate, includes at least one filter element, and extends in a scanning direction.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The preferred embodiment of the present invention will be described in detail below with reference to the accompanying drawings.

Figure 1A:
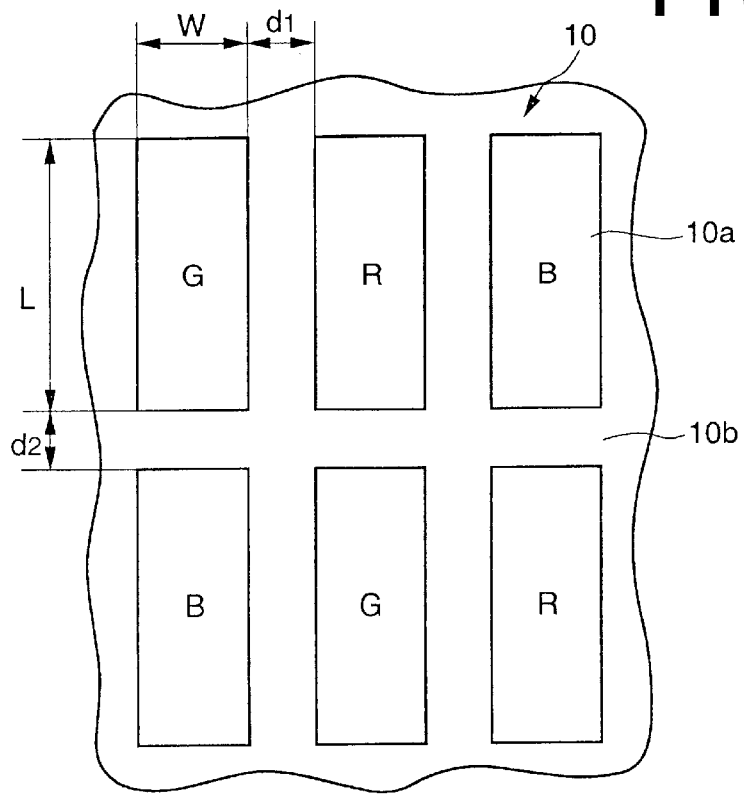
FIGS. 1A and 1B are enlarged views of color filters manufactured by a manufacturing method and apparatus of the present invention.
Figure 1B:
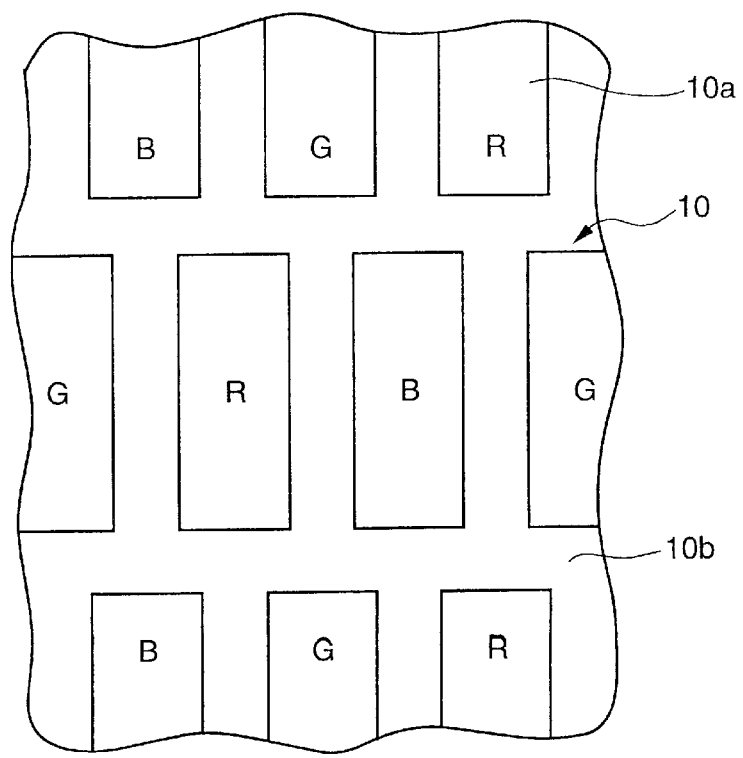

FIGS. 1A and 1B are partial enlarged views of color filters manufactured by a manufacturing method and apparatus according to the present invention.

Each color filter 10 is mounted on the front surface of a color liquid crystal display or the like used for a portable personal computer or the like. As shown in FIG. 1A, filter elements 10a colored in R (red), G (green), and B (blue) are two-dimensionally arranged in a matrix form. In the color filter shown in FIG. 1A, the filter elements 10a are arranged in a simple matrix form. In the color filter shown in FIG. 1B, the filter elements 10a are arranged in a staggered form. A black light-shielding grating 10b is formed between the respective filter elements 10a to make the boundaries between the filter elements 10a clear so as to provide a clear screen.

Figure 2:
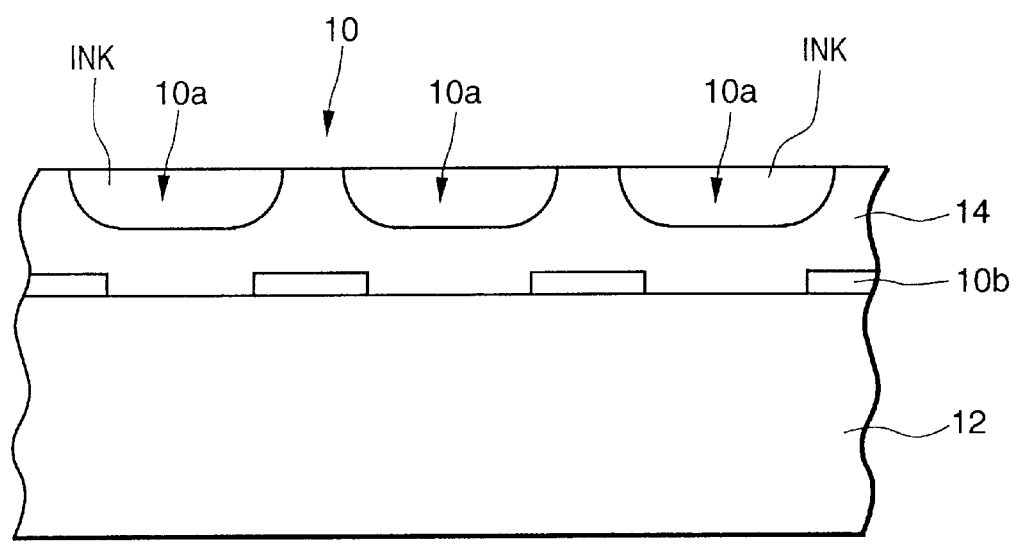
FIG. 2 is a sectional side view of the color filter in FIGS. 1A and 1B.

FIG. 2 is a side sectional view of the color filter 10 in FIG. 1A or 1B. The light-shielding grating 10b is formed on a glass substrate 12 constituting the main body of the color filter 10. The filter elements 10a of the respective colors are formed on the light-shielding grating 10b.

In manufacturing the color filter 10, chromium is deposited on the glass substrate 12 by sputtering, and the resultant film is formed into a matrix pattern by photolithography. This pattern is the light-shielding grating 10b. A layer 14 to be dyed is formed on the light-shielding grating 10b. The layer 14 consists of a cellulose, an acrylic resin, gelatin, or the like and absorbs a fluid. Droplets (to be referred to as an ink hereinafter) containing a coloring material (dye) are sprayed on the filter element formation regions of the layer 14 by a recording head of the ink-jet system. With this process, the layer 14 is colored to form the color filter elements 10a. Note that a pigment or ultraviolet-curing ink may be used instead of a dye. When a pigment or ultraviolet-curing ink is to be used, the layer 14 may not be required.

A protective layer is formed, as needed. As the protective layer, for example, a layer consisting of a resin material of a photo-setting, thermosetting, or photo-setting/thermosetting type, or an inorganic film formed by vapor deposition, sputtering, or the like can be used. Such a layer can be used as long as it exhibits transparency upon formation of a color filter and can withstand the subsequent processes, e.g., an ITO (Indium Tin Oxide) formation process and an aligning film formation process.

Figure 3:
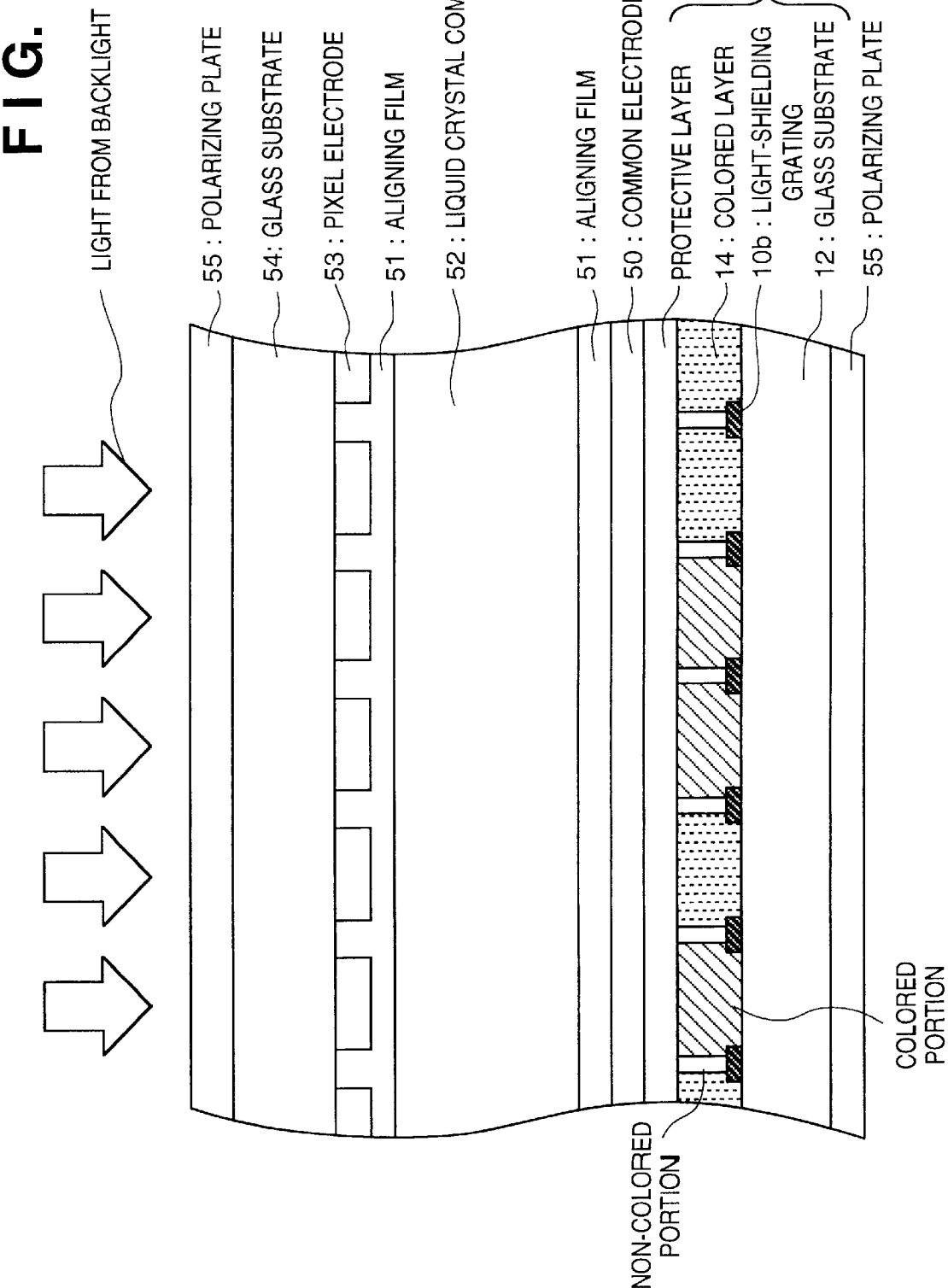
FIG. 3 is a sectional side view showing the structure of a color liquid crystal panel.
Figure 4:
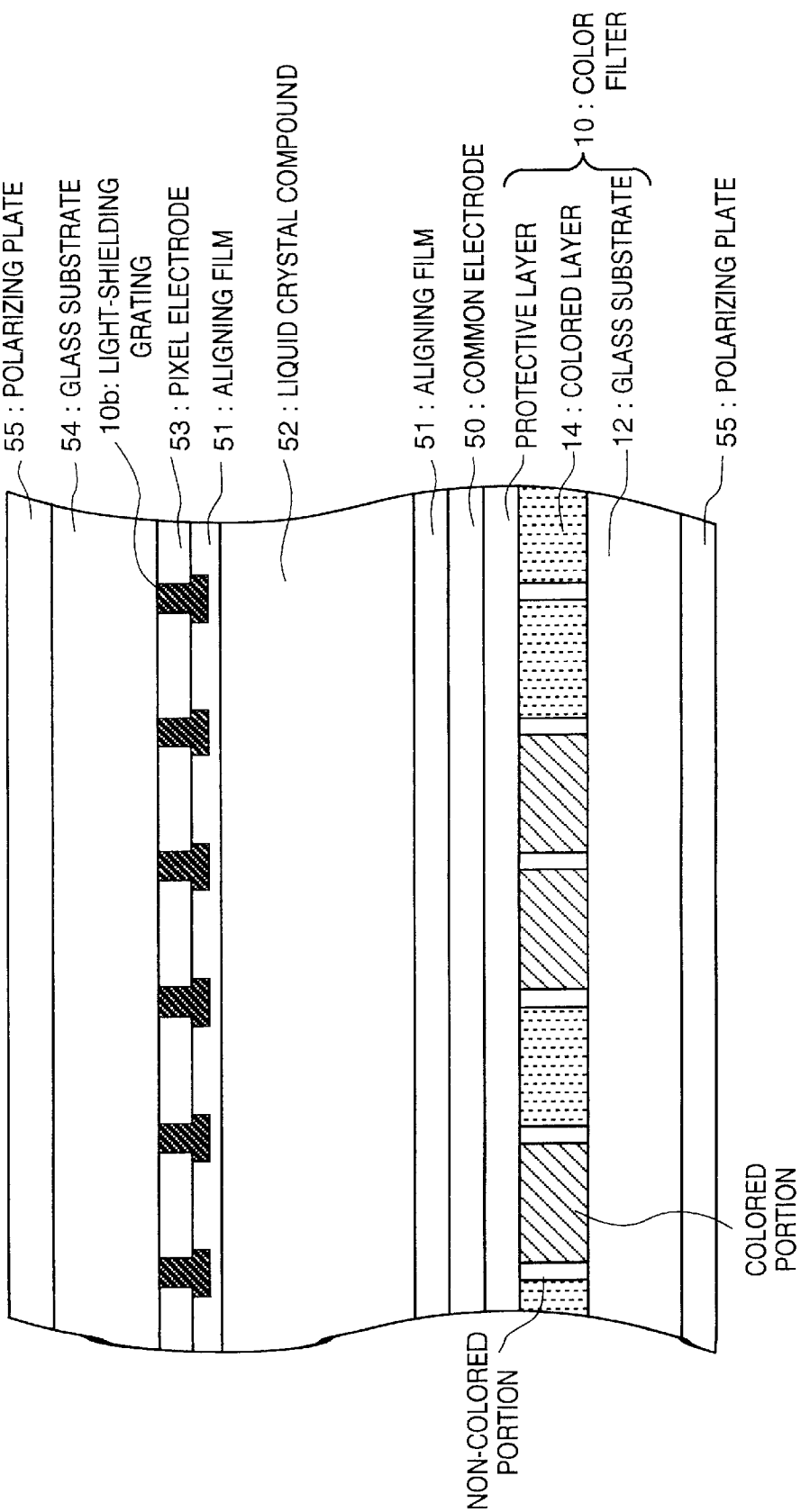
FIG. 4 is a sectional side view showing the structure of a color liquid crystal panel.

In general, a color liquid crystal panel is formed by joining the color filter substrate 12 to a counter substrate 54 and sealing a liquid crystal compound 52 therebetween. TFTs (Thin Film Transistors) (not shown) and transparent pixel electrodes 53 are formed on the inner surface of one substrate 54 of the liquid crystal panel in a matrix form. The color filter 10 is placed on the inner surface of the other substrate 12 such that the R, G, and B coloring materials are positioned to oppose the pixel electrodes. A transparent counter electrode (common electrode) 50 is formed on the entire surface of the color filter 10. The light-shielding grating 10b is generally formed on the color filter substrate 12 side (see FIG. 3). However, in a BM (Black Matrix) on-array type liquid crystal panel, such a grating is formed on the TFT substrate side opposing the color filter substrate (see FIG. 4). Aligning films 51 are formed within the planes of the two substrates. By performing a rubbing process for the aligning films 51, the liquid crystal molecules can be aligned in a predetermined direction. Polarizing plates 55 are bonded to the outer surface of the respective glass substrates. The liquid crystal compound 52 is filled in the gap (about 2 to 5 $\mu$m) between these glass substrates. As a blacklight, a combination of a fluorescent lamp (not shown) and a scattering plate (not shown) is generally used. A display operation is performed by causing the liquid crystal compound to serve as an optical shutter for changing the transmittance for light emitted from the backlight.

A case wherein the above liquid crystal panel is applied to an information processing apparatus will be described below with reference to FIGS. 5 to 7.

Figure 5:
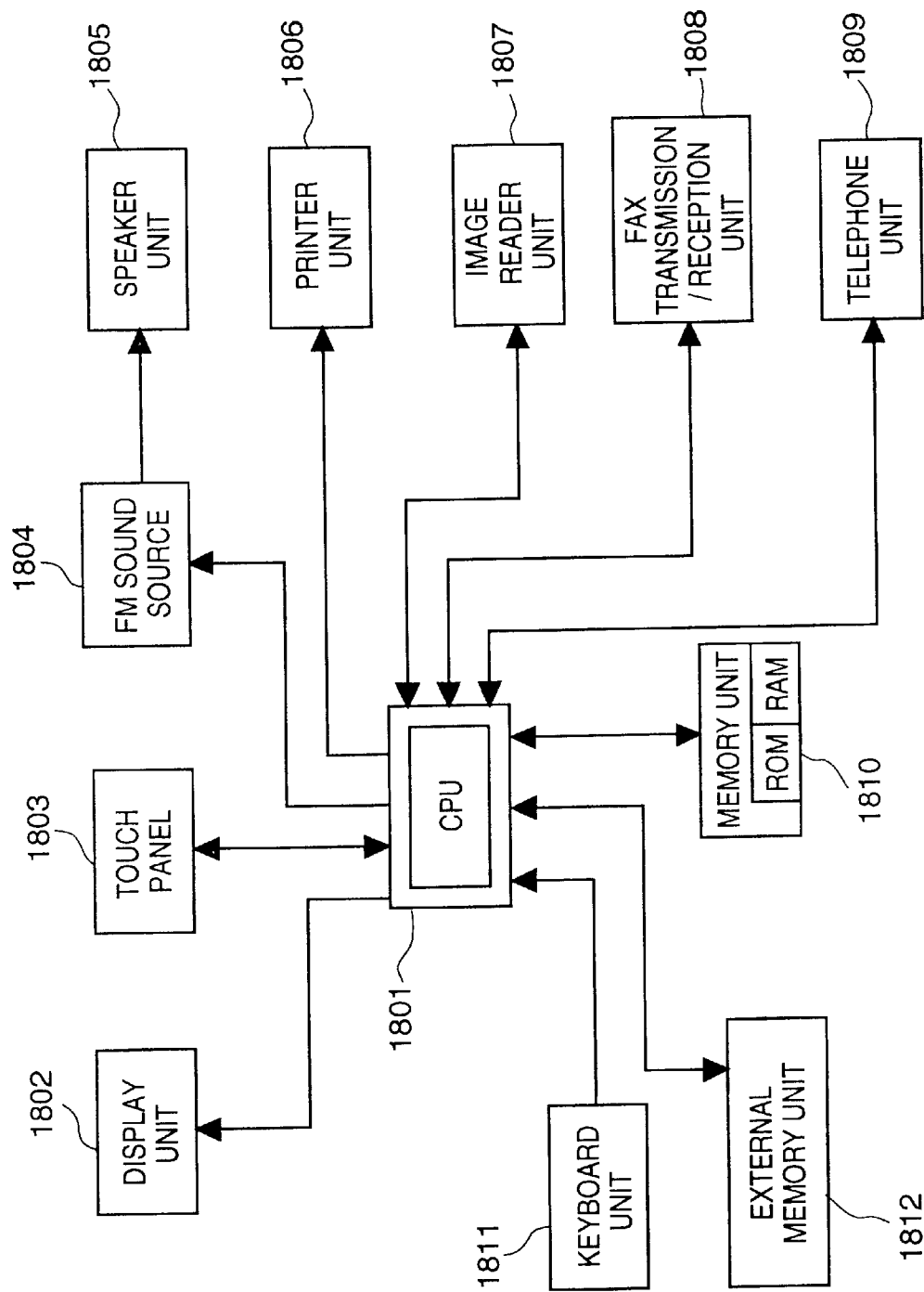
FIG. 5 is a block diagram showing an information processing apparatus using the liquid crystal panel.

FIG. 5 is a block diagram showing the schematic arrangement of an information processing apparatus serving as a wordprocessor, a personal computer, a facsimile apparatus, and a copying machine, to which the above liquid crystal panel is applied.

Referring to FIG. 5, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader 1807, and the like on the display screen; 1803, a transparent, pressure-sensitive touch panel mounted on the display unit 1802. By pressing the surface of the touch panel 1803 with a finger of the user or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. An electrical signal from the FM sound source unit 1804 is converted into an audible sound by a speaker unit 1805. A printer unit 1806 is used as an output terminal for the wordprocessor, the personal computer, the facsimile apparatus, and the copying machine.

Reference numeral 1807 denotes an image reader unit for photoelectrically reading original data. The image reader unit 1807 is arranged midway along the original convey passage and designed to read originals for facsimile and copy operations and other various originals.

Reference numeral 1808 denotes a transmission/reception unit for the facsimile (FAX) apparatus. The transmission/reception unit 1808 transmits original data read by the image reader unit 1807 by facsimile, and receives and decodes a sent facsimile signal. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs of the user, and the like.

Figure 6:
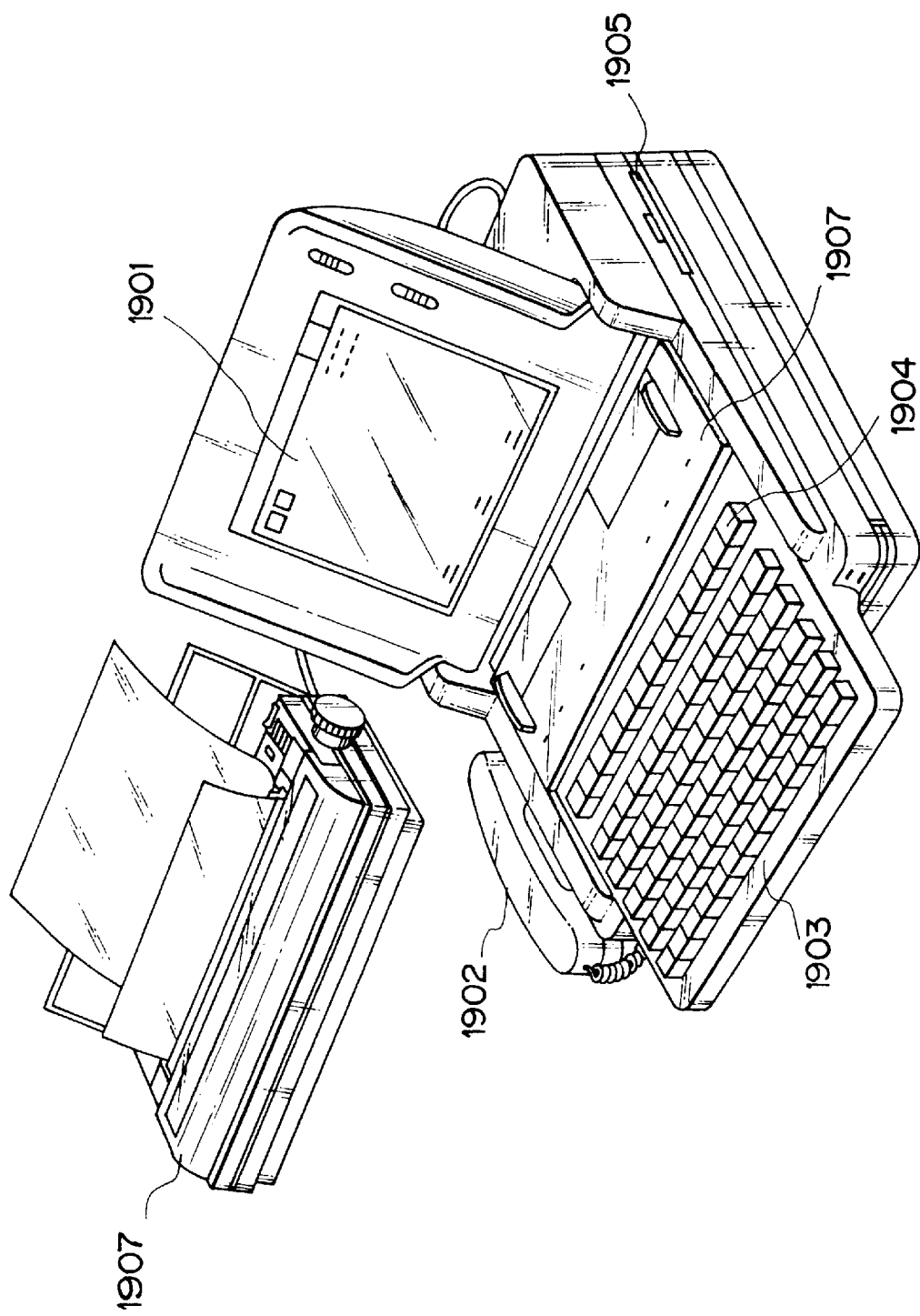
FIG. 6 is a perspective view showing the information processing apparatus using the liquid crystal panel.

FIG. 6 is a perspective view of the information processing apparatus in FIG. 5.

Referring to FIG. 6, reference numeral 1901 denotes a flat panel display using the above liquid crystal panel, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original table on which an original to be read by the image reader unit 1807 is placed. The read original is discharged from the rear portion of the apparatus. In a facsimile receiving operation, received data is printed out by an ink-jet printer 1907.

When the above information processing apparatus is to serve as a personal computer or a wordprocessor, various kinds of information input through the keyboard unit 1811 are processed by the control unit 1801 in accordance with a predetermined program, and the resultant information is output, as an image, to the printer unit 1806.

When the information processing apparatus is to serve as the receiver of the facsimile apparatus, facsimile information input through the transmission/reception unit 1808 via a communication line is subjected to reception processing in the control unit 1801 in accordance with a predetermined program, and the resultant information is output, as a received image, to the printer unit 1806.

When the information processing apparatus is to serve as the copying machine, an original is read by the image reader unit 1807, and the read original data is output, as an image to be copied, to the printer unit 1806 via the control unit 1801. Note that when the information processing apparatus is to serve as the receiver of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 7:
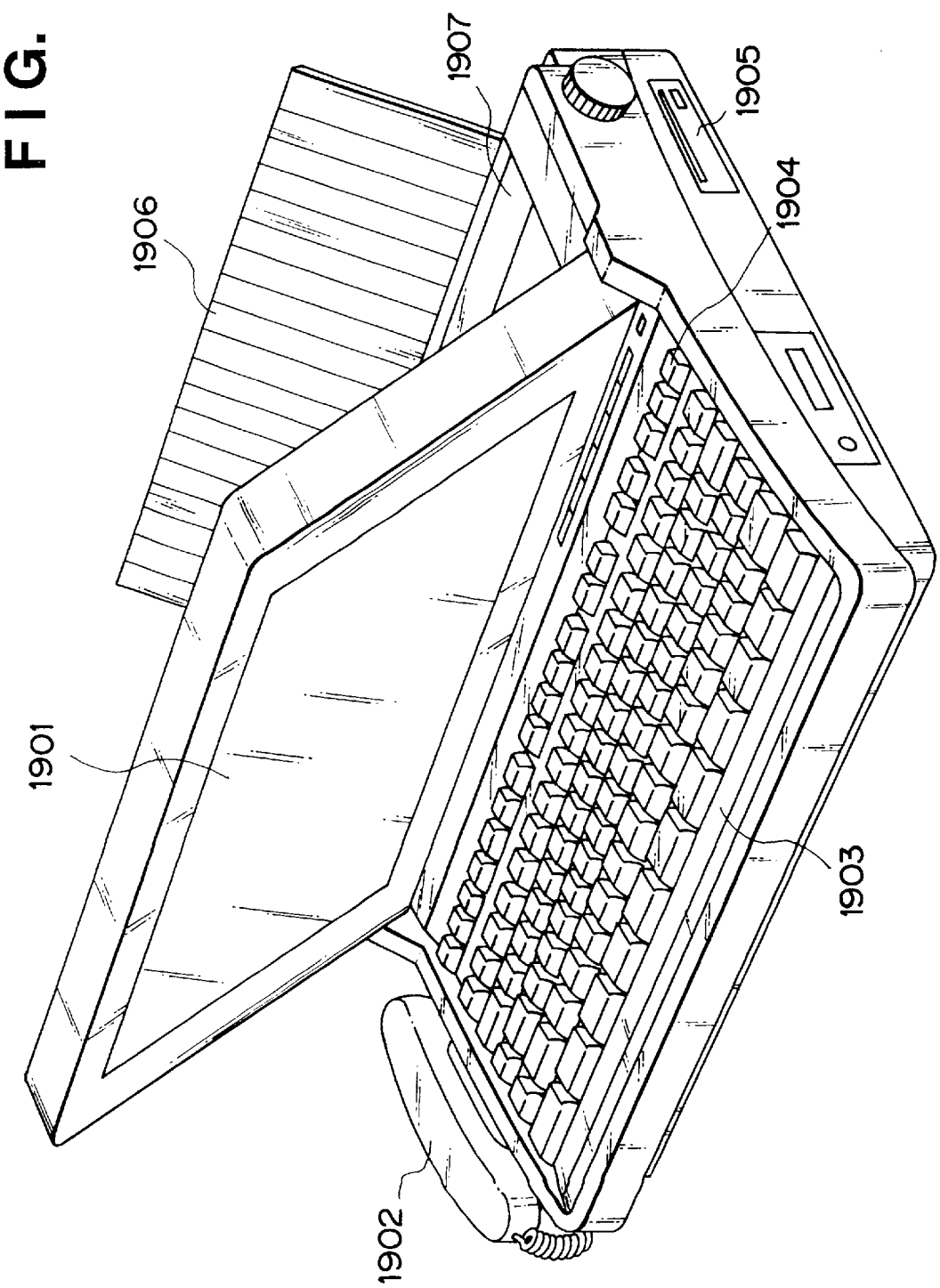
FIG. 7 is a perspective view showing the information processing apparatus using the liquid crystal panel.

Note that the above information processing apparatus may be designed as an integrated apparatus incorporating an ink-jet printer in the main body, as shown in FIG. 7. In this case, the portability of the apparatus can be improved. The same reference numerals in FIG. 7 denote parts having the same functions as those in FIG. 6.

Figure 8:
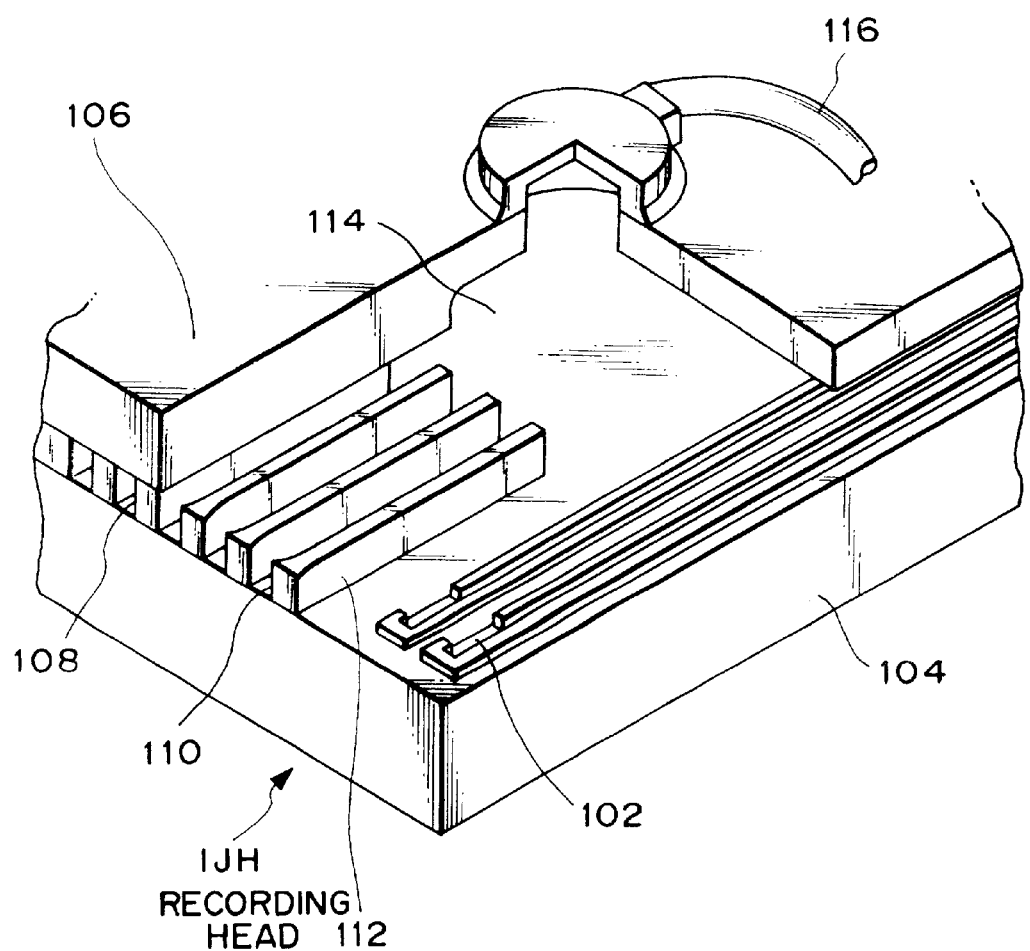
FIG. 8 is a perspective view showing an ink-jet head IJH for spraying an ink on a layer to be dyed.

FIG. 8 shows the structure of an ink-jet head IJH for spraying ink on the layer 14 in the color filter described above.

Referring to FIG. 8, the ink-jet head IJH mainly comprises a heater board 104 as a board on which a plurality of heaters 102 for heating an ink are formed, and a ceiling plate 106 mounted on the heater board 104. A plurality of discharging openings 108 are formed in the ceiling plate 106. Tunnel-like fluid passages 110 communicating with the discharging openings 108 are formed therebehind. The respective fluid passages 110 are isolated from the adjacent fluid passages via partition walls 112. The respective fluid passages 110 are commonly connected to one ink chamber 114 at the rear side of the fluid passages. An ink is supplied to the ink chamber 114 via an ink inlet 116. This ink is supplied from the ink chamber 114 to each fluid passage 110.

The heater board 104 and the ceiling plate 106 are positioned such that the position of each heater 10 coincides with that of a corresponding fluid passage 110, and are assembled into the state shown in FIG. 8. Although FIG. 8 shows only two heaters 102, the heater 102 is arranged in correspondence with each fluid passage 110. When a predetermined driving signal is supplied to the heater 102 in the assembled state shown in FIG. 8, an ink above the heater 102 is boiled to produce a bubble, and the ink is pushed and discharged from the discharging opening 108 upon volume expansion of the ink. Therefore, the size of a bubble can be adjusted by controlling a driving pulse applied to the heater 102, e.g., controlling the magnitude of power. That is, the volume of the ink discharged from each discharging opening can be arbitrarily controlled.

Figure 9:
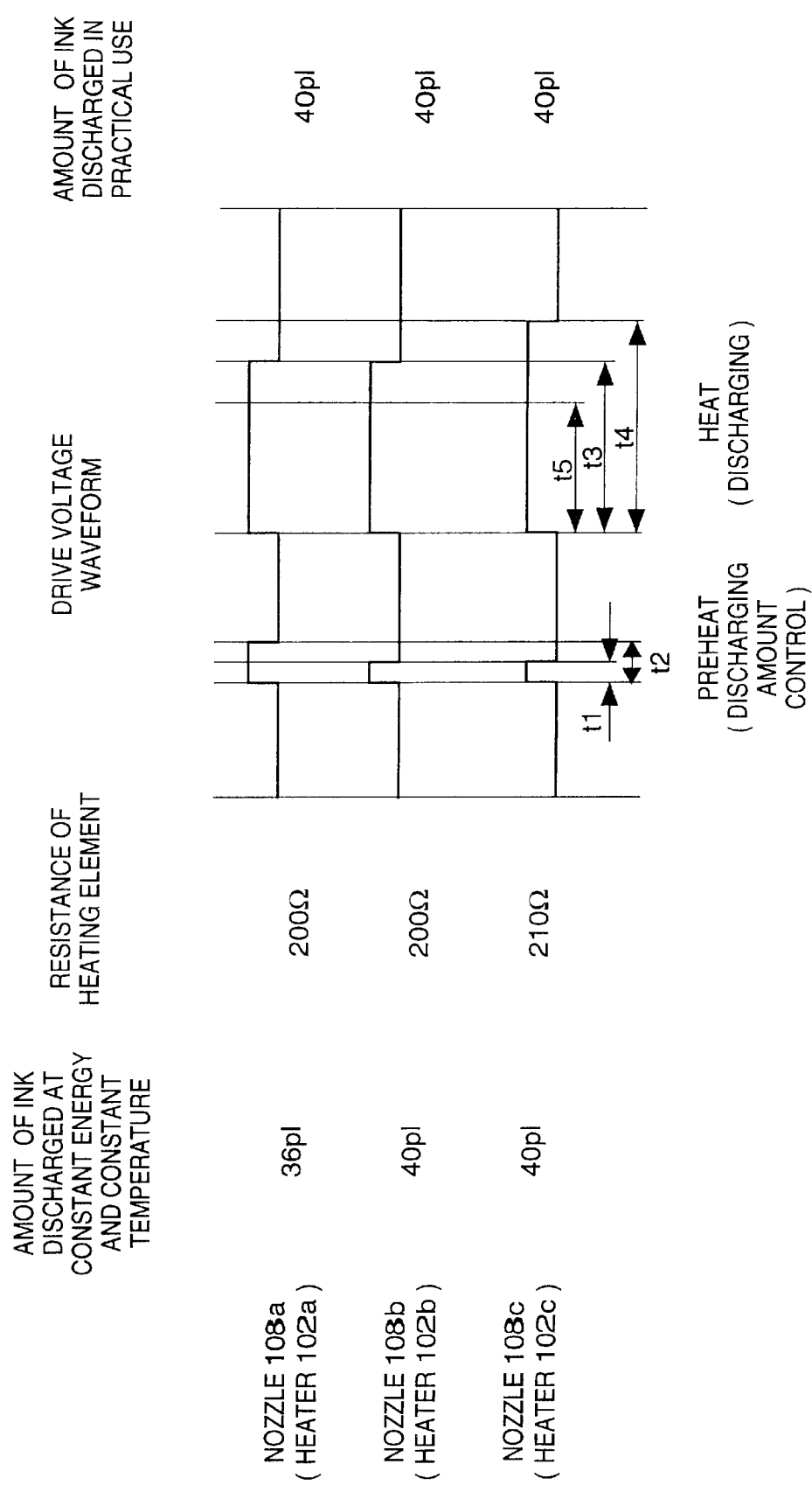
FIG. 9 is a view for explaining a method of controlling the amount of ink discharged by changing power supplied to heaters.

FIG. 9 is a timing chart for explaining a method of controlling the amount of ink discharged by changing power supplied to each heater in this manner.

In this embodiment, two types of constant-voltage pulses are applied to each heater 102 to adjust the amount of ink discharged. The two pulses are a preheat pulse and a main heat pulse (to be simply referred to as a heat pulse hereinafter). The preheat pulse is a pulse for heating an ink to a predetermined temperature before the ink is actually discharged. The pulse width of this pulse is set to be smaller than a minimum pulse width t5 required to discharge the ink. Therefore, the ink is not discharged by this preheat pulse. The preheat pulse is applied to each heater 102 to increase the initial temperature of the ink to a predetermined temperature in advance so as to always make the amount of ink discharged constant when a constant heat pulse is applied to the heater 102 afterward. In contrast to this, the temperature of the ink may be adjusted in advance by adjusting the width of a preheat pulse. In this case, for the same heat pulse, the amount of ink discharged can be changed. In addition, by heating ink before application of a heat pulse, the start time required to discharge the ink upon application of the heat pulse can be shortened to improve the responsibility.

The heat pulse is a pulse for actually discharging the ink. The pulse width of the heat pulse is set to be larger than the minimum pulse width t5 required to discharge the ink. Energy generated by each heater 102 is proportional to the width (application time) of a heat pulse. Therefore, variations in the characteristics of the heaters 102 can be adjusted by adjusting the width of each heat pulse.

Note that the amount of ink discharged can also be adjusted by adjusting the interval between a preheat pulse and a heat pulse to control the dispersed state of heat upon application of the preheat pulse.

As is apparent from the above description, the amount of ink discharged can be controlled both by adjusting the application time of a preheat pulse and by adjusting the interval between application of a preheat pulse and that of a heat pulse. Therefore, by adjusting the application time of a preheat pulse or the interval between application of a preheat pulse and that of a heat pulse as needed, the amount of ink discharged or the responsibility of discharging of the ink with respect to an applied pulse can be arbitrarily adjusted.

Such adjustment of the amount of ink discharged will be described in detail next.

Assume that an ink is discharged in different amounts from discharging openings (nozzles) 108a, 108b, and 108c upon application of the same voltage pulse, as shown in FIG. 9. More specifically, assume that when a voltage having a predetermined pulse width is applied at a predetermined temperature, the amount of ink discharged from the nozzle 108a is 36 pl (pico-liters); the amount of ink discharged from the nozzle 108b, 40 pl; and the amount of ink discharged from the nozzle 108c, 40 pl, and the resistance of heaters 102a and 102b corresponding to the nozzles 108a and 108b is 200 Ω, and the resistance of a heater 102c corresponding to the nozzle 108c is 210 Ω. Assume that the amounts of ink discharged from the nozzles 108a, 108b, and 108c are to be adjusted to 40 pl.

The widths of a preheat pulse and a heat pulse may be adjusted to adjust the amounts of ink discharged from the nozzles 108a, 108b, and 108c to the same amount. Various combinations of the widths of preheat pulses and heat pulses are conceivable. In this case, the amounts of energy generated by heat pulses are made equal for the three nozzles, and the amounts of ink discharged are adjusted by adjusting the widths of preheat pulses.

Since the heaters 102a and 102b for the nozzles 108a and 108b have the same resistance, i.e., 200 Ω, the amounts of energy generated by heat pulses can be made equal by applying voltage pulses having the same width to the heaters 102a and 102b. In this case, the width of each voltage pulse is set to be t3 which is larger than the width t5. An ink is discharged in different amounts, i.e., 36 pl and 40 pl, from the nozzles 108a and 108b upon application of identical heat pulses. In order to increase the amount of ink discharged from the nozzle 108a, a preheat pulse having a width t2 larger than a width t1 of a preheat pulse applied to the heater 102b is applied to the heater 102a. With this operation, the amounts of ink discharged from the heaters 108a and 108b can be adjusted to 40 pl.

The heater 102c for the nozzle 108c has a resistance of 210 Ω, which is higher than the resistance of the two remaining heaters 102a and 102b. For this reason, in order to cause the heater 102c to generate the same amount of energy as that generated by the two remaining heaters, the width of a heat pulse must be set to be larger than that of the above heat pulse. In this case, therefore, the width of the heat pulse is set to be t4 which is larger than the width t3. Since the amounts of ink discharged from the nozzles 108b and 108c upon application of a predetermined pulse are the same, the width of a preheat pulse required is equal to that of a preheat pulse applied to the heater 102b. That is, a preheat pulse having the width t1 is applied to the heater 102c.

In the above manner, the same amount of ink can be discharged from the nozzles 108a, 108b, and 108c which discharge an ink in different amounts upon application of a predetermined pulse. In addition, the amounts of ink discharged may be intentionally made to differ from each other. Note that preheat pulses are used to reduce variations in the discharging operation of each nozzle.

Another method of controlling the amount of ink discharged from each nozzle will be described next.

Figure 22:
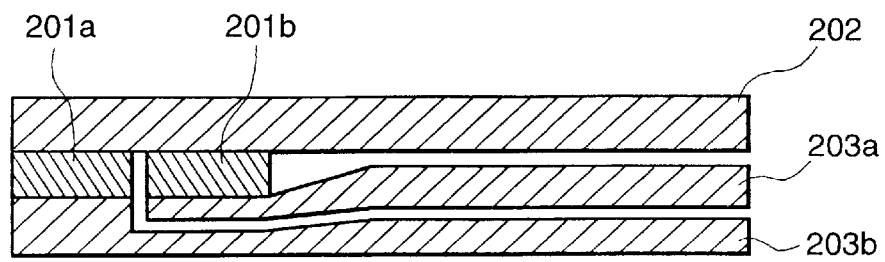
FIG. 22 is a sectional view showing a nozzle having two heaters.

FIG. 22 shows a structure in which two or more heaters are disposed for one nozzle, and the amount of ink discharged is continuously changed by continuously shifting the phases of voltage pulses applied to the respective heaters.

FIG. 22 shows the arrangement of heaters and electrodes per nozzle. An ink-jet head can be formed by using this pattern instead of the heaters 102 in FIG. 8.

Figure 23:
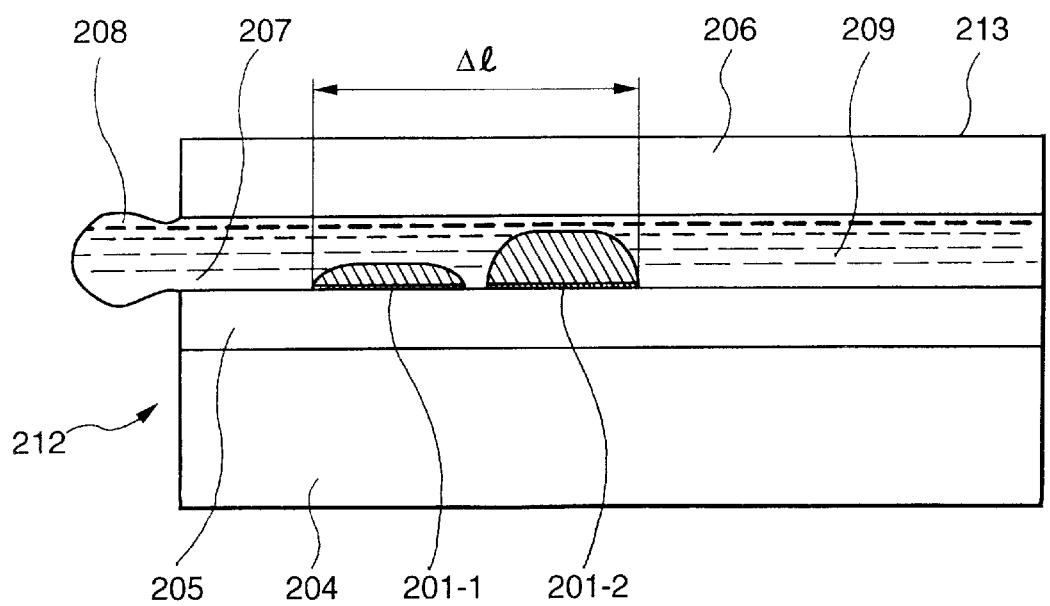
FIG. 23 is a sectional view showing the nozzle having two heaters.

This arrangement includes electrodes 202, 203a, and 203b for independently supplying power to each of two heaters 201a and 201b per nozzle. FIG. 23 is a schematic sectional view showing a state in which a bubble is produced by applying voltage pulses to the heaters 201a and 201b of the ink-jet head having the heater/electrode pattern in FIG. 22 while shifting the phases of the pulses. The heaters 201a and 201b produce bubbles upon evaporation of an ink at different timings. For this reason, when these bubbles are observed at a certain timing, bubbles of different sizes are seen, as shown in FIG. 23.

Note that the electrodes 202 and 203 are not shown in FIG. 23.

Referring to FIG. 23, a passage 209 to be filled with an ink is formed by using a heater board 212 and a ceiling plate 213. More specifically, the heater board 212 is obtained by forming a heat-storage layer 205 on a substrate 204 made of a glass material or the like, and mounting heaters and electrodes on the heat-storage layer 205 according to the pattern shown in FIG. 22. A groove having a predetermined width is formed in the ceiling plate 213 to define the passage 209. The heater board 212 is joined to the ceiling plate 213 such that the groove covers the heaters and the electrodes. A nozzle 207 is formed at an end of the passage 209. A heat application portion A1 is a passage portion including a heat generating surface of a heater 201. The heater 201 generates heat at the heat application portion A1 in accordance with an input voltage pulse to cause an abrupt change in the state of the ink at the heat application portion A1, i.e., evaporation of the ink, so as to produce a bubble. As a result, an ink 208 is discharged from the nozzle 207. FIGS. 24A to 24D schematically show the relationship between the timings of voltage pulses input to the heaters 201a and 201b, the volume of a bubble, and the amount of ink discharged.

Referring to FIGS. 24A to 24D, the solid lines represent voltage pulses to be applied, and the broken lines represent the volumes of bubbles upon generation of heat.

Figure 24A:
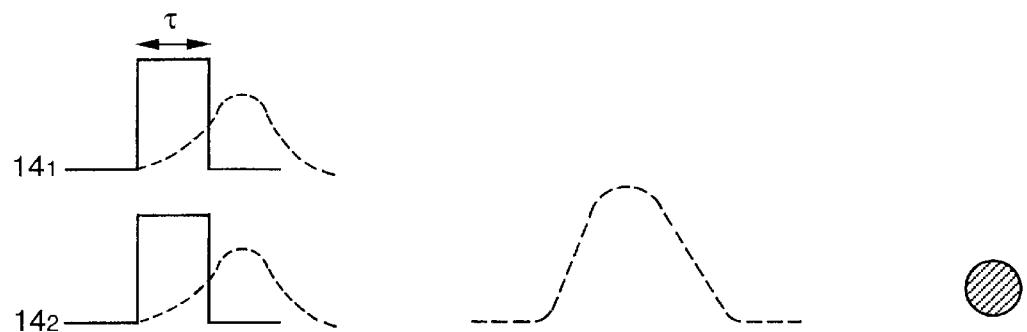
FIGS. 24A to 24D are graphs showing each showing the relationship between the amount of ink discharged and the phase shift between voltage pulses applied to the two heaters.

FIG. 24A shows a case wherein voltage pulses are applied to the two heaters 201a and 201b at the same timing. In this case, a bubble having the maximum volume is produced, and a large amount of ink is discharged.

Figure 24B:
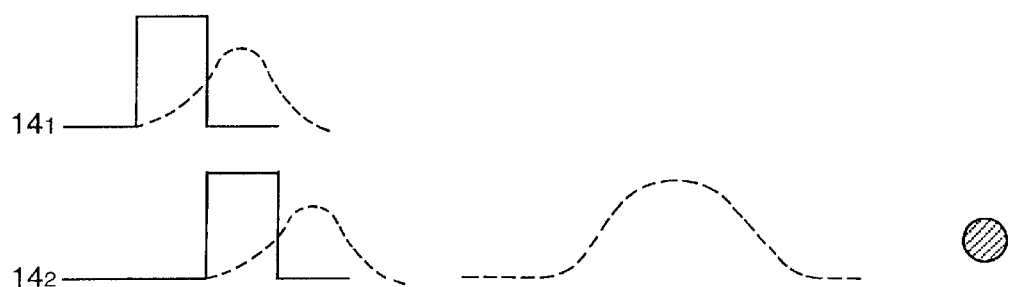

FIG. 24B shows a case wherein the input timings are shifted from each other by a pulse width t. In this case, the maximum volume of combined bubbles decreases, and the amount of ink discharged also decreases.

Figure 24C:
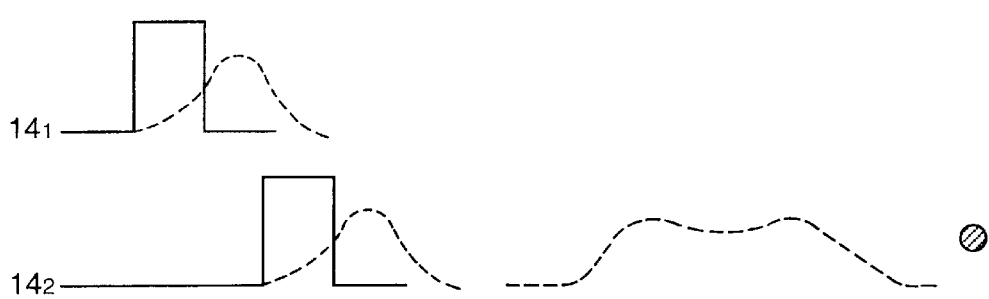
Figure 24D:
Figure 25:
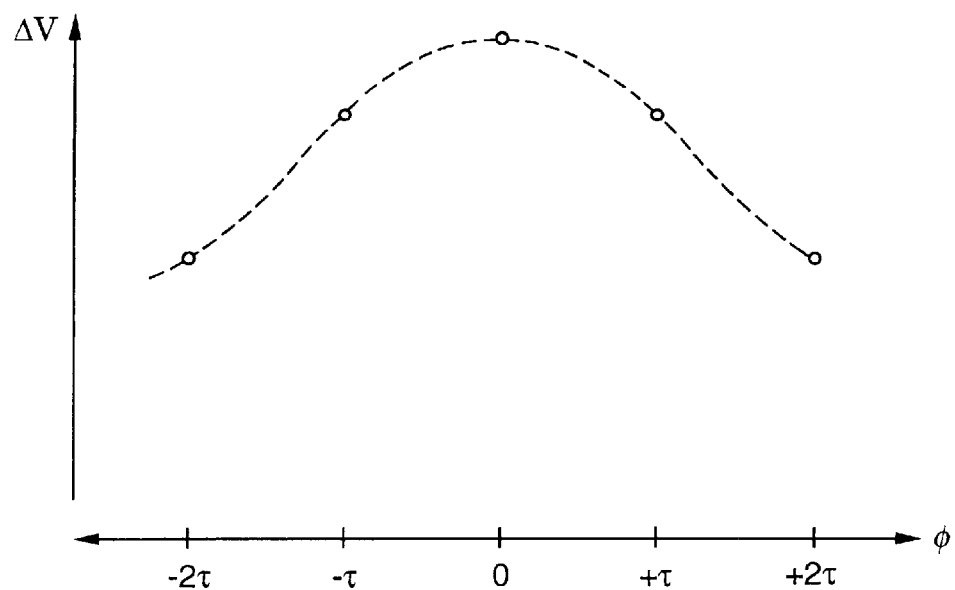
FIG. 25 is a graph showing the relationship between the amount of ink discharged and the phase shift between voltage pulses applied to the two heaters.

FIG. 24C shows a case wherein the input timings are shifted from each other by 2τ. In this case, the amount of ink discharged is equal to that in the case shown in FIG. 24D in which only one heater is driven. FIG. 25 is a graph showing the relationship between such timing shifts and the volume of a discharged ink.

Figure 26:
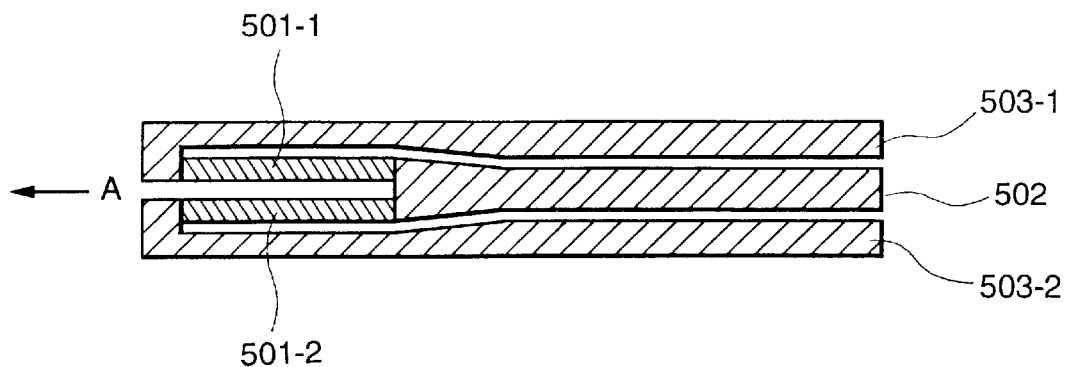
FIG. 26 is a sectional view showing another nozzle having two heaters.

In this embodiment, the timing shift range in which gradation characteristics can be obtained is −2τ to +2τ. This range, however, changes depending on the applied pulse width t, the structure of a substrate, the type of ink, the pattern/positions of heaters, and the like. Control is generally performed in the range of ±20τ, preferably the range of ±5τ. In addition, the heaters need not be arranged along the passage, as shown in FIG. 22. The heaters may be arranged in a direction perpendicular to the discharging direction indicated by an arrow A, as shown in FIG. 26. Furthermore, the two heaters need not have the same pattern, and heaters having different areas may be combined. Moreover, multiple gradation levels are required, three or more heaters may be used, as needed.

Figure 10:
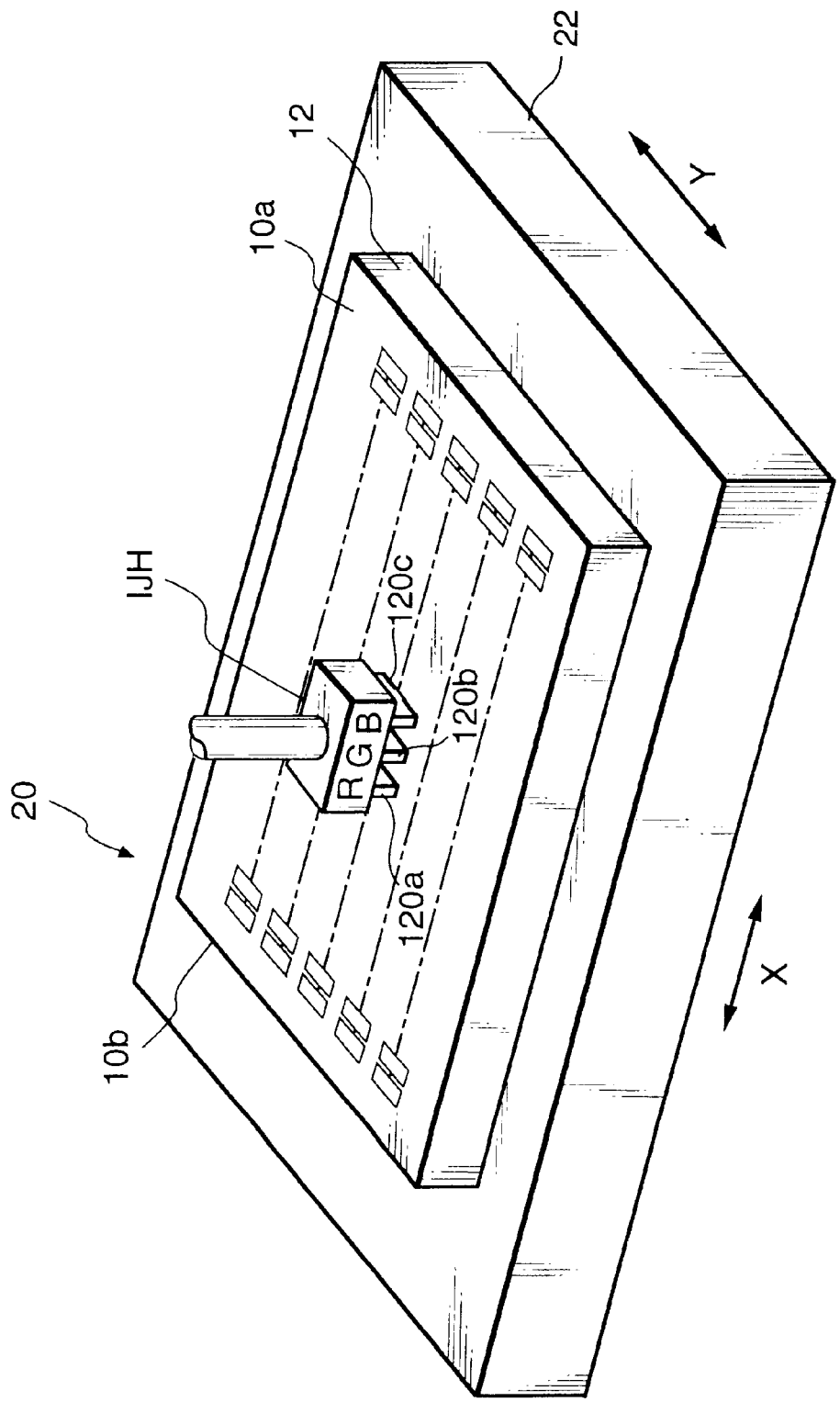
FIG. 10 is a perspective view showing the arrangement of a manufacturing apparatus for manufacturing the color filter in FIGS. 1A to 2.

FIG. 10 is a perspective view showing the arrangement of a manufacturing apparatus for manufacturing the color filter in FIGS. 1A to 2.

Referring to FIG. 10, a manufacturing apparatus 20 comprises an X-Y table 22 mounted on a base (not shown) and capable of moving in the X and Y directions in FIG. 10, and an ink-jet head IJH fixed on a base via a support member (not shown) above the X-Y table 22. A glass substrate 12 on which a light-shielding grating 10b and a layer 14 to be dyed (see FIG. 2) are formed by the above method is placed on the X-Y table 22. The ink-jet head IJH includes a red head 120a for discharging a red ink, a green head 120b for discharging a green ink, and a blue head 120c for discharging a blue ink. These heads 120a, 120b, and 120c are designed to discharge inks independently.

In the manufacturing apparatus 20 having the above arrangement, an R (red), G (green), or B (blue) ink is discharged into a desired frame of the light-shielding grating 10b while the X-Y table 22 moves with respect to the ink-jet head IJH in the X and Y directions. In this manner, each frame of the light-shielding grating 10b is colored to complete a color filter.

Figure 11:
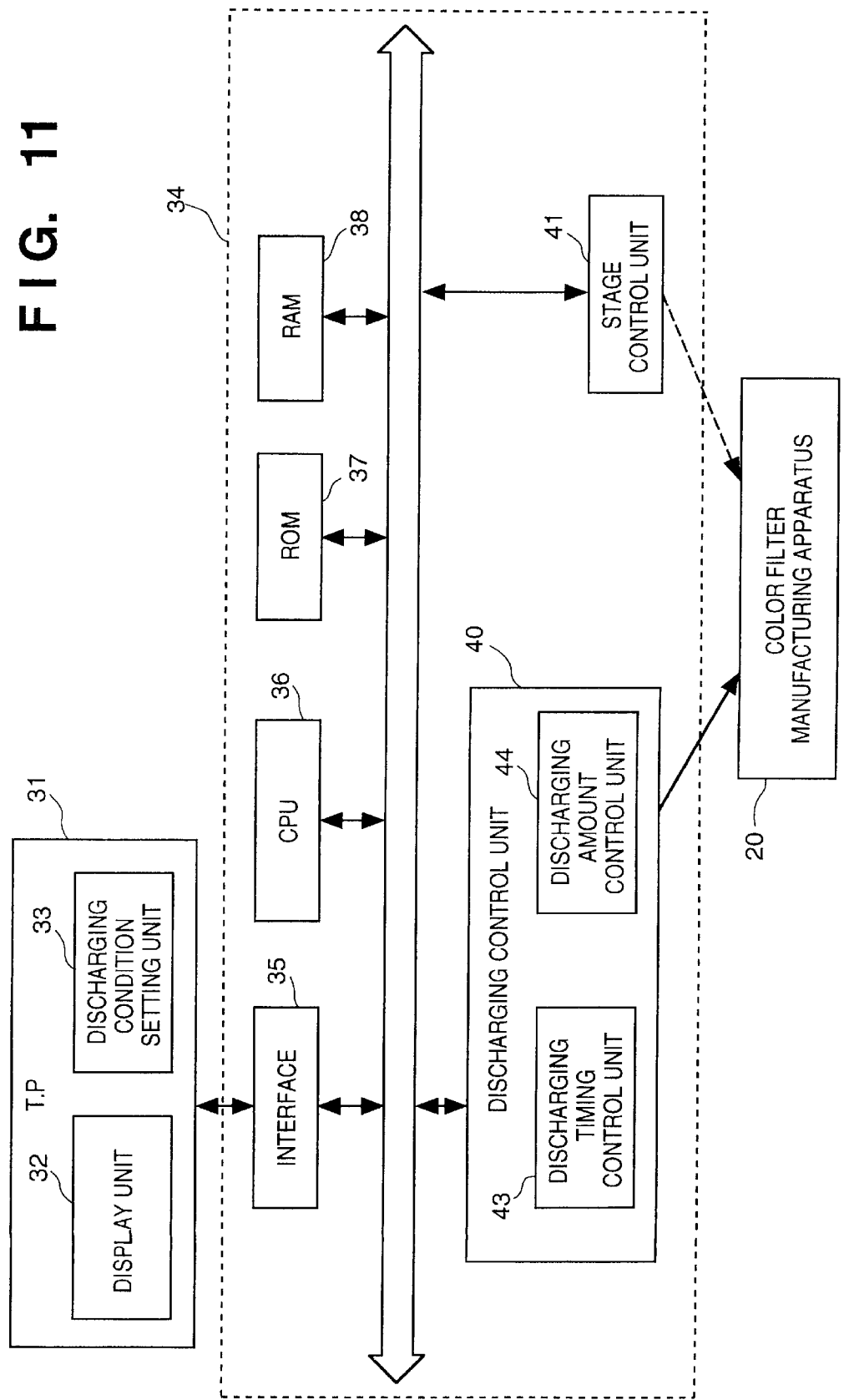
FIG. 11 is a block diagram showing the arrangement of a controller of the color filter manufacturing apparatus.

FIG. 11 is a block diagram showing the arrangement of a controller of the manufacturing apparatus 20.

Referring to FIG. 11, reference numeral 31 denotes a teaching pendant as an input/output means of the controller; 32, a display unit for displaying results such as ink discharge information; and 33, a setting unit for setting discharging conditions such as a discharging pattern.

Reference numeral 34 denotes a controller for controlling the color filter manufacturing apparatus 20; 35, an interface for exchanging data with the teaching pendant 31; 36, a CPU for performing stage control and orbital plan calculation for the manufacturing apparatus 20; 37, a ROM storing control programs for operating the CPU 36; 38, a RAM for storing data such as discharging conditions; and 40, a discharging control unit 40 for controlling the discharging pattern of a coloring agent, which is an important portion of this embodiment. The discharging control unit 40 is constituted by a discharging timing control unit 43 for controlling a discharging start position, a discharging interval, and the number of times of discharging, and a discharging amount control unit 44 for controlling the size of a dot in a filter element. Reference numeral 41 denotes a control unit for the X-Y table 22 of the manufacturing apparatus 20 which is connected to the controller 34 and operates in accordance with a designation therefrom.

In this embodiment, an ink is discharged from the orifices of the ink-jet head IJH by the ink-jet system, and the filter elements 10a of the color filter 10 are colored with ink dots. As the ink-jet system, a system based on heat energy or a system based on mechanical energy may be used. Either of the systems will do. An ink to be used is not specifically limited as long as it can be used for an ink-jet operation. As coloring agents for the ink, agents suitable for the transmission spectra required for R, G, and B filter elements are properly selected from various dyes and pigments.

Ink dots may be directly formed on the glass substrate 12 having the light-shielding grating 10b and the transparent portions (the portions enclosed with the light-shielding grating 10b, i.e., the filter elements). However, as described above, the transparent layer 14 to be dyed is preferably formed on the glass substrate 12. As a material for the layer 14, acrylic resin, epoxy resin, imido resin, or a cellulose derivative such as hydroxypropyl cellulose, hydroxy ethyl cellulose, methyl cellulose, carboxymethyl cellulose is preferably used. As a method of forming the layer 14, spin coating, roller coating, bar coating, spraying, dipping, or the like can be used.

Although the thickness of the layer 14 to be dyed differs depending on the type and composition of an ink to be used for pattern formation, the amount of ink discharged, a method of using the ink, and the like, the thickness is preferably about 0.1 to 50 μm.

A problem posed in this case is that the characteristics of coloring agents for R, G, and B inks greatly vary depending on the characteristics of the layer 14 to be dyed, the shape of the light-shielding grating 10b (see FIG. 20), the maximum process temperature in the manufacturing process, manufacturers, and the type of a substrate. As described above, in the ink-jet system, the discharging positions and the amounts of inks discharged greatly influence white omission and color mixture.

The operation of this embodiment which is to be performed to solve the above problem will be sequentially described with reference to FIGS. 12 to 19. Referring to FIGS. 12 to 19, each white circle indicates the state of an ink several seconds after the impact of the ink.

Figure 12:
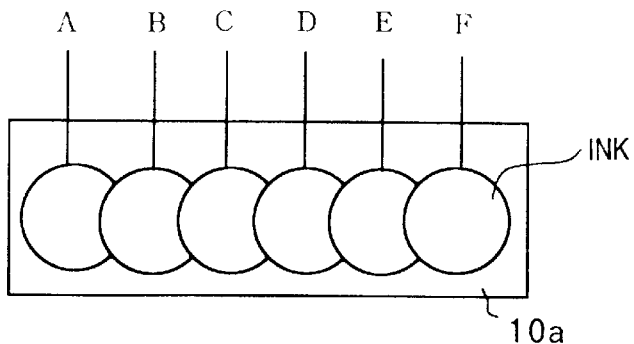
FIG. 12 is a view showing the relationship between the discharging positions and the number of ink dots and the manner in which a filter element is colored.
Figure 13:
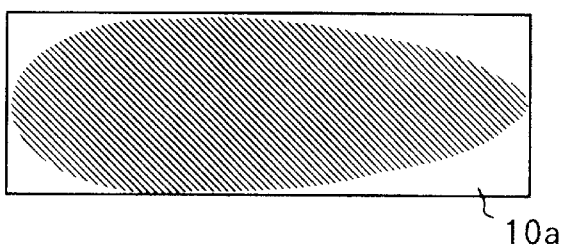
FIG. 13 is a view showing the relationship between the discharging positions and the number of ink dots and the manner in which a filter element is colored.
Figure 14:
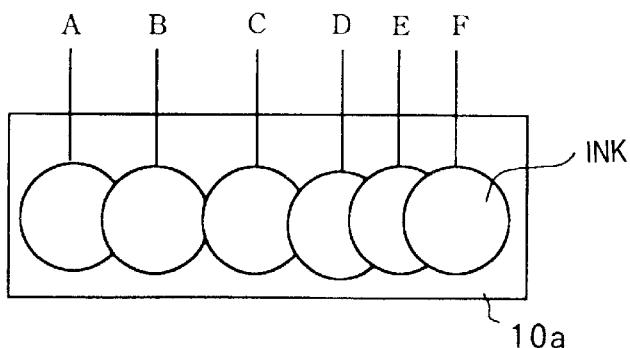
FIG. 14 is a view showing the relationship between the discharging positions and the number of ink dots and the manner in which a filter element is colored.
Figure 15:
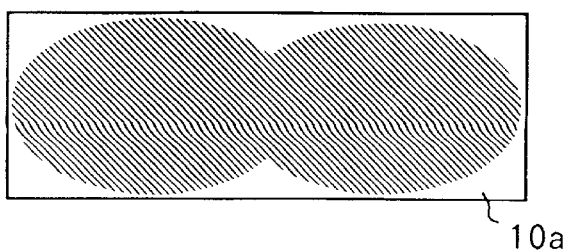
FIG. 15 is a view showing the relationship between the discharging positions and the number of ink dots and the manner in which a filter element is colored.
Figure 16:
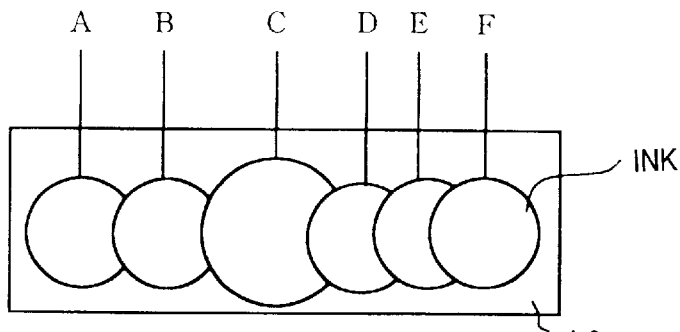
FIG. 16 is a view showing the relationship between the discharging positions and the number of ink dots and the manner in which a filter element is colored.
Figure 17:
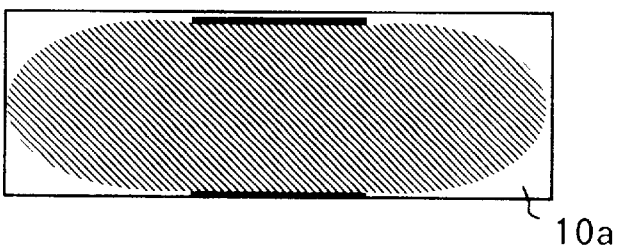
FIG. 17 is a view showing the relationship between the discharging positions and the number of ink dots and the manner in which a filter element is colored.
Figure 18:
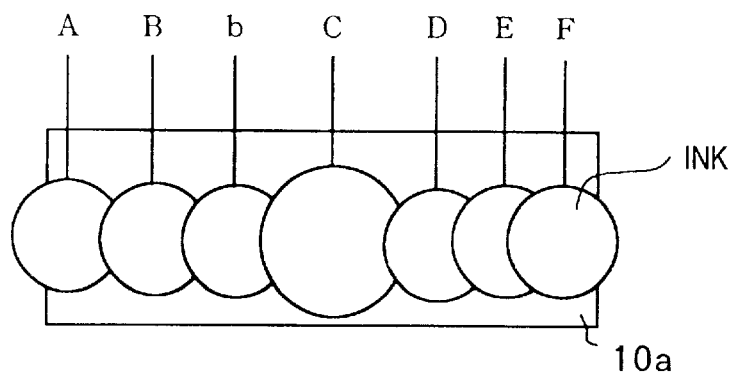
FIG. 18 is a view showing the relationship between the discharging positions and the number of ink dots and the manner in which a filter element is colored.
Figure 19:
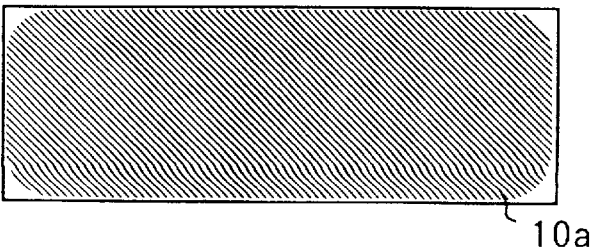
FIG. 19 is a view showing the relationship between the discharging positions and the number of ink dots and the manner in which a filter element is colored.

When a plurality of ink dots are discharged at equal intervals as shown in FIG. 12, large white omissions appear at peripheral portions as shown in FIG. 13. In addition, the succeeding ink dots are attracted/absorbed by the preceding ink dots, resulting in the shape shown in FIG. 13. When ink dots are discharged in the shape shown in FIG. 14 in such a manner that the intervals between dots B and C, and dots C and D in FIG. 12 are increased, and the intervals between dots D and E, and dots E and F are decreased, the ink pattern expands in the shape shown in FIG. 15. If the amount of ink discharged is increased at the dot C as shown in FIG. 16, the ink pattern expands in the shape shown in FIG. 17. Although the shape in FIG. 17 is better, white omissions appear at the corner portions. When the discharging start position of the dot A is slightly shifted, and a dot b is added after the dot B, the ink pattern expands in a considerably good shape, and a color filter having no white omission can be formed, as shown in FIG. 19.

Figure 20A:
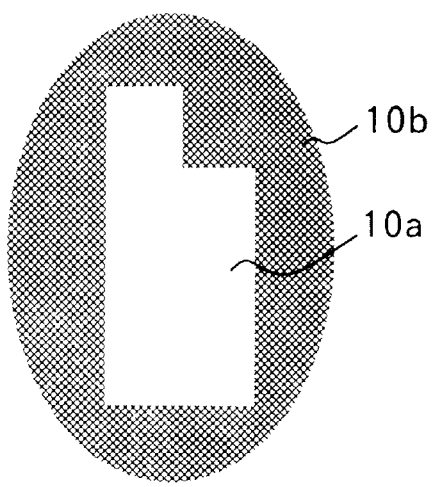
FIGS. 20A to 20C are views showing the shapes of light-shielding gratings.
Figure 20B:
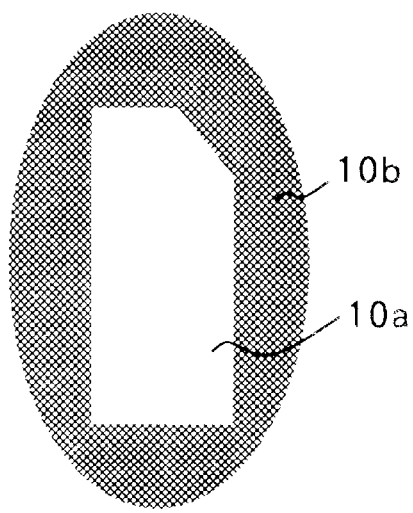
Figure 20C:
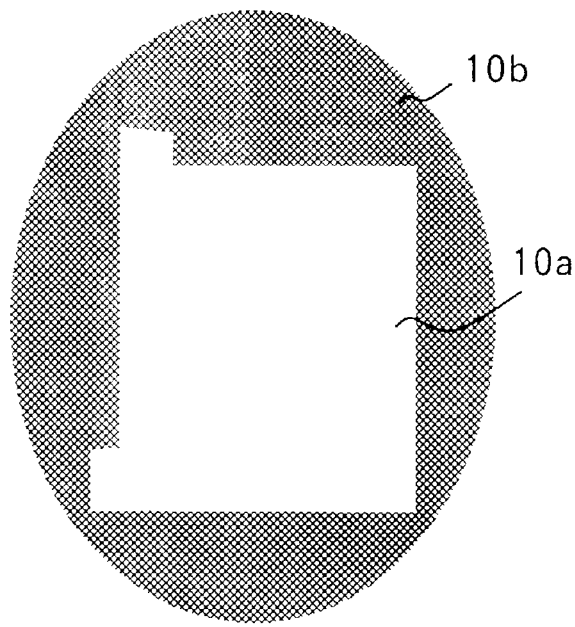
Figure 21A:
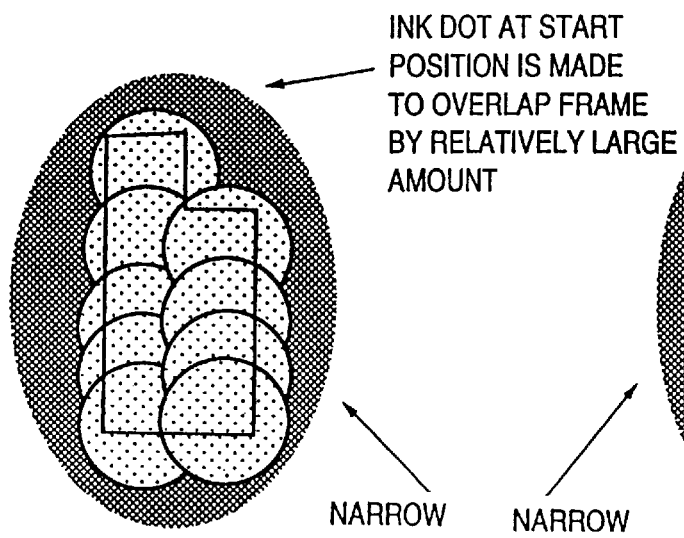
FIGS. 21A to 21C are views each showing the relationship between the discharging positions and the number of ink dots and the manner in which a filter element is colored.
Figure 21B:
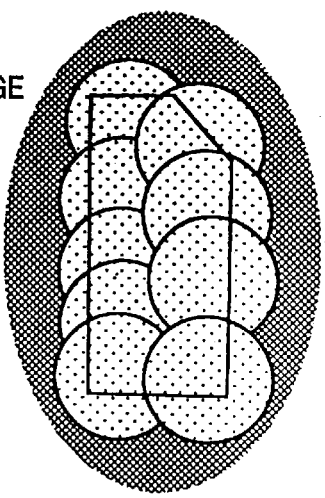
Figure 21C:
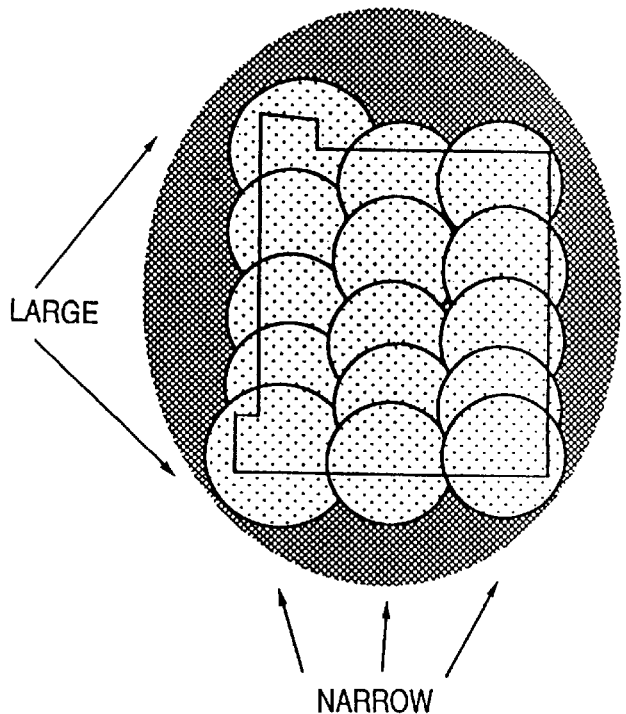

As is apparent, the above phenomenon is just an example, and various phenomena may occur depending on the shape of the light-shielding grating 10b, the properties of inks, and the properties of the layer 14 to be dyed. If, for example, light-shielding gratings like those shown in FIGS. 20A to 20C are used, color filters can be properly colored by using discharging patterns like those shown in FIGS. 21A to 21C.

These ink discharging patterns are controlled by the discharging control unit 40 in FIG. 11.

In the above embodiment, an ink is discharged onto each filter element by using one of the patterns shown in FIGS. 12 to 21C. However, the present invention can be applied to cases wherein a plurality of filter elements arranged in the scanning direction of the ink-jet head are continuously colored, as shown in FIGS. 27 and 28.

Figure 27:
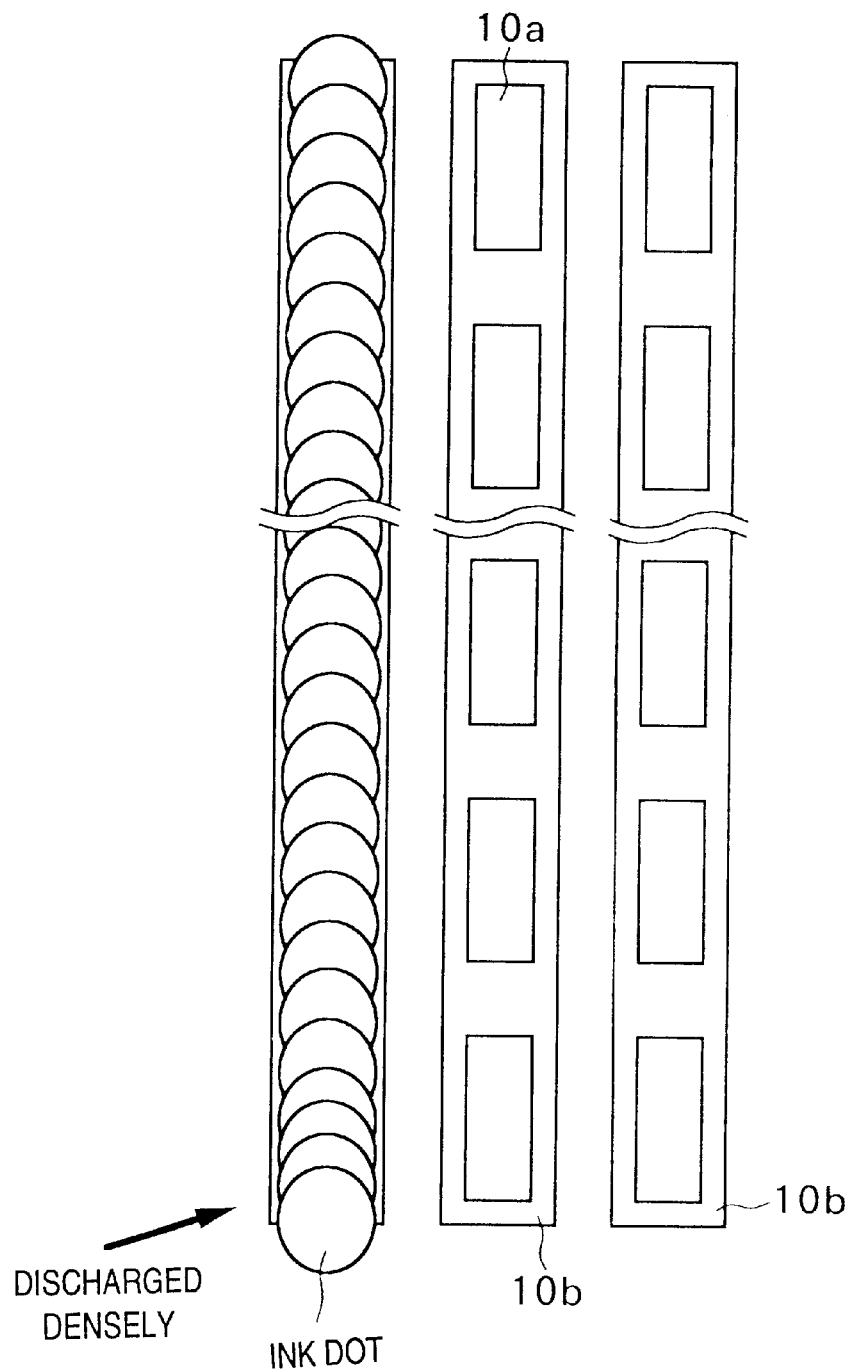
FIG. 27 is a view showing a case wherein one row of filter elements in the scanning direction is continuously colored.
Figure 28:
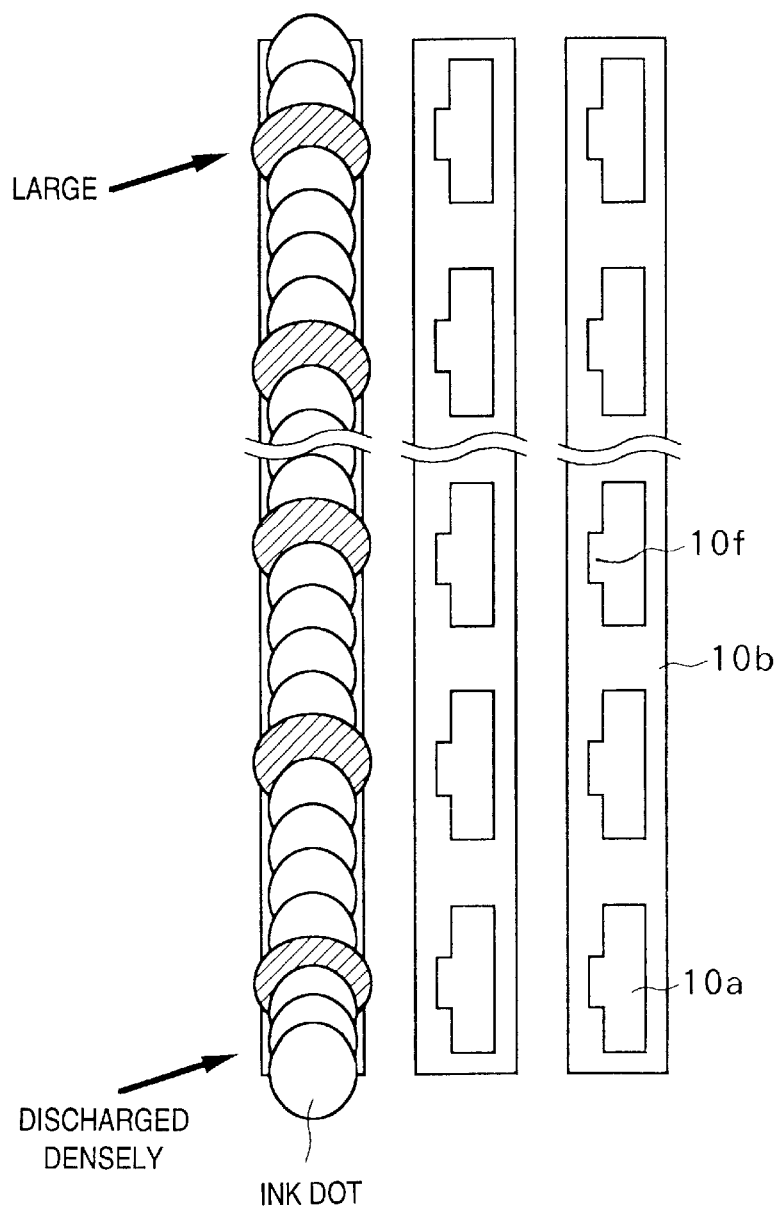
FIG. 28 is a view showing a case wherein one row of filter elements in the scanning direction is continuously colored.

In the cases in FIGS. 27 and 28, an ink is also continuously discharged onto light-shielding grating portions serving as partitions for the respective filter elements in the scanning direction of the ink-jet head to continuously color the filter elements as one line from the start to the end of one scanning operation. Even if one row of filter elements extending in the scanning direction is continuously colored in this manner, since a user of a liquid crystal display apparatus or the like sees the color filters from the reverse side to the colored surfaces, the respective filter elements of the color filter look reliably partitioned off by the light-shielding grating. That is, no problem is posed in practice.

Figure 29:
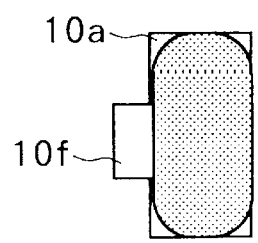
FIG. 29 is a view showing a state wherein a white omission has occurred at the protruding portion of a filter element.

When a row of filter elements in the scanning direction is to be continuously colored as shown in FIG. 27, this row is considered as one filter element. In this case, similar to the pattern in FIG. 18, ink dots are discharged such that some ink dots overlap the light-shielding grating 10b at the early stage of a scanning operation, and ink dots are densely sprayed at the last stage of the scanning operation. With this operation, white omissions at the early and last stages of the scanning operation can be prevented. If each filter element has a protruding portion 10f as shown in FIG. 28, the amount of ink discharged is increased at this portion to form a large ink dot like the one indicated by the hatching in FIG. 28. With this operation, a white omission as indicated by the portion 10f in FIG. 29 can be prevented, and hence a high-quality color filter can be manufactured. In this case as well, if the intervals between ink dots are decreased at the last stage of the scanning operation, a white omission at the last stage of the scanning operation can be prevented at the same time.

In practice, a manufacturing line for color filters must cope with various types of-color filters with various sizes and types of substrates. In this case, manufacturing lines may be arranged for every type of color filters, and manufacturing processes may be set by using fixed discharging methods. However, such a manufacturing method is not practical.

In manufacturing various types of high-performance color filters, various stages on a manufacturing line are inevitably replaced. In this case, various types of color filters are difficult to manufacture by a manufacturing method without the discharging control unit 40 for setting discharging conditions as in this embodiment.

As described above, by using the color filter manufacturing method and apparatus of this embodiment, optimal ink dot discharging methods for the shapes of various light-shielding plates, the properties of inks, and the properties of layers to be dyed can be set. This allows the manufacture of an inexpensive, reliable color filter capable of obtaining a clear image without color irregularity.

In addition, a flexible manufacturing line for manufacturing plurality of types of color filters can be easily set.

Various changes and modifications of the above embodiments can be made without departing the scope and spirit of the invention.

For example, as the ink-jet head, a so-called piezoelectric type head using mechanical energy converters such as piezoelectric elements may be used. In this case, the volume of the ink discharged can be easily adjusted by adjusting the applied voltage of a driving pulse. When a bipolar driving operation is to be performed, the ink volume can be adjusted by adjusting both or either of bipolar driving pulses.

The present invention can be applied to a single-color filter and a filter of a type having a plurality of single-color filters of different colors stacked on each other.

According to the above description, the present invention is applied to the print apparatus of the system, among various ink-jet recording systems, which has a means (e.g., an electricity-to-heat converter or laser light) for generating heat energy as energy used to discharge an ink, and changes the state of an ink by using the heat energy. According to this system, a high-density, high-resolution recording operation can be realized.

As for the typical structure and principle, it is preferable that the basic structure disclosed in, for example, U.S. Pat. Nos. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place are applied to the electricity-to-heat converter in accordance with recording information so as to generate heat energy in the electricity-to-heat converter and to cause the heat effecting surface of the recording head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the recording head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for the case by use of a recording head of the cartridge type provided integrally on the recording head itself.

It is preferred to additionally employ the recording head restoring means and the auxiliary means provided as the component of the present invention because the effect of the present invention can be further stabled. Specifically, it is preferable to employ a recording head capping means, a cleaning means, a pressurizing or suction means, an electricity-to-heat converter, an another heating element or a sub-heating means constituted by combining them and a sub-emitting mode in which an emitting is performed independently from the recording emitting in order to stably perform the recording operation.

Although a fluid ink is employed in the aforesaid embodiment of the present invention, an ink which is solidified at the room temperature or lower and as well as softened at the room temperature, an ink in the form of a fluid at the room temperature, or an ink which is formed into a fluid when the recording signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, an ink which is solidified when it is caused to stand, and liquified when heat energy is supplied in accordance with a recording signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

As has been described above, according to the present invention, the discharging start position of an ink discharged into a frame partitioning off each filter element is changed to change the amount by which this ink overlap the frame. With this operation, white omissions at the corners of each frame owing to variations in materials for inks and substrates of the respective lots can be reduced as compared with the case wherein coloring is started at a predetermined position in each frame.

When a plurality of inks are to be shifted/discharged into each frame partitioning off a filter element with the droplets overlapping each other, a white omission at one side of the filter element can be prevented by decreasing the intervals between inks discharged in an overlapping state at the last stage of the coloring process.

In addition, when a plurality of inks are to be shifted/discharged into each frame partitioning off a filter element with the droplets overlapping each other, variations in nozzles for discharging inks can be corrected by changing the number of inks to be discharged in an overlapping state, thereby preventing density irregularity in coloring filter elements.

Furthermore, when a plurality of inks are to be shifted/discharged into each frame partitioning off a filter element with the droplets overlapping each other, white omissions and the like of each filter element can be prevented by partially increasing the amount of ink discharged onto a portion where irregularity tends to occur.

The present invention is not limited to the above embodiments and various changes and modifications can be made within the spirit and scope of the present invention. Therefore, to apprise the public of the scope of the present invention the following claims are made.

What is claimed is:

1. A color filter manufacturing method of coloring each of many filter elements partitioned off by many frames by discharging an ink colored in a predetermined color to color each of the filter elements, thereby manufacturing a color filter, said method
comprising the step of, in coloring each of the filter elements by shifting discharging positions of a plurality of inks so that a part of each ink dot overlaps a part of an adjacent ink dot, setting a discharging start position of an ink discharged to color the filter element while setting an amount of ink discharged at the start position larger than amounts of inks discharged at the positions other than the start position.

2. The method according to claim 1, wherein the ink is discharged by using an ink-jet head for performing a coloring operation by discharging an ink.

3. The method according to claim 2, wherein said ink-jet head is a head for discharging an ink by using heat energy, said head having a heat energy generator for generating heat energy applied to the ink.

4. The method according to claim 3, wherein a volume of the ink discharged is controlled by changing a driving pulse applied to said heat energy generator.

5. The method according to claim 1, wherein the filter elements are colored in different colors.

6. A color filter manufacturing method of coloring each of many filter elements partitioned off by many frames by discharging an ink colored in a predetermined color to color each of the filter elements, thereby manufacturing a color filter, said method
comprising the step of decreasing intervals between ink discharged at a last stage of a discharging process in coloring each of the filter elements comparing to intervals of ink of preceding discharging stages, when a plurality of inks are to be shifted and discharged, in a partially overlapping state, to color each of the filter elements.

7. The method according to claim 6, wherein the ink is discharged by using an ink-jet head for performing a coloring operation by discharging an ink.

8. The method according to claim 7, wherein said ink-jet head is a head for discharging an ink by using heat energy, said head having a heat energy generator for generating heat energy applied to the ink.

9. The method according to claim 8, wherein a volume of the ink discharged is controlled by changing a driving pulse applied to said heat energy generator.

10. The method according to claim 6, wherein the filter elements are colored in different colors.

11. A color filter manufacturing method of coloring each of many filter elements partitioned off by many frames by discharging an ink colored in a predetermined color to color each of the filter elements, thereby manufacturing a color filter, said method comprising the step of setting the number of inks, to be discharged, in accordance with an amount of ink discharged in coloring each of the filter elements, when a plurality of inks are to be shifted and discharged, in a partially overlapping state, to color each of the filter elements.

12. The method according to claim 11, wherein the ink is discharged by using an ink-jet head for performing a coloring operation by discharging an ink.

13. The method according to claim 12, wherein said ink-jet head is a head for discharging an ink by using heat energy, said head having a heat energy generator for generating heat energy applied to the ink.

14. The method according to claim 13, wherein a volume of the ink discharged is controlled by changing a driving pulse applied to said heat energy generator.

15. The method according to claim 11, wherein the filter elements are colored in different colors.

16. The method according to claim 11, further comprising the step of, in coloring each of the filter elements, discharging the ink such that an ink dot overlaps the frame at an edge of the filter element when the color filter is seen from a direction perpendicular to a surface of the color filter.

17. The method according to claim 16, wherein the filter elements are light transmitting portions of the color filter.

18. The method according to claim 16, wherein the frame is a light shielding portion of the color filter.

19. A color filter manufacturing method of coloring each of many filter elements partitioned off by many frames by discharging an ink colored in a predetermined color to color each of the filter elements, thereby manufacturing a color filter, said method comprising the step of setting amounts of ink discharged to be different in units of inks in coloring each of the filter elements, when a plurality of inks are to be shifted and discharged, in a partially overlapping state, to color each of the filter elements.

20. The method according to claim 19, wherein the ink is discharged by using an ink-jet head for performing a coloring operation by discharging an ink.

21. The method according to claim 20, wherein said ink-jet head is a head for discharging an ink by using heat energy, said head having a heat energy generator for generating heat energy applied to the ink.

22. The method according to claim 21, wherein a volume of the ink discharged is controlled by changing a driving pulse applied to said heat energy generator.

23. The method according to claim 19, wherein the filter elements are colored in different colors.

24. A color filter manufacturing apparatus for coloring each of many filter elements partitioned off by many frames by discharging an ink colored in a predetermined color to color each of the filter elements, thereby manufacturing a color filter, comprising:

discharge means for discharging a colored ink onto the substrate;

moving means for moving relative positions of said discharging means and the substrate; and control means for, when each of the filter elements is to be colored by shifting discharging positions of a plurality of inks so that a part of each ink dot overlaps a part of an adjacent ink dot, controlling said moving means and said discharge means to set an amount of ink discharged at the start position larger than amounts of inks discharged at the positions other the start position by setting a discharging start position of the ink discharged.

25. The apparatus according to claim 24, wherein said discharge means is an ink-jet head for performing a coloring operation by discharging an ink.

26. The apparatus according to claim 25, wherein said ink-jet head is a head for discharging an ink by using heat energy, said head having a heat energy generator for generating heat energy applied to the ink.

27. The apparatus according to claim 26, wherein a volume of the ink discharged from said ink-jet head is controlled by changing a driving pulse applied to said heat energy generator.

28. The apparatus according to claim 27, wherein a volume of the discharged ink is controlled by selectively using a plurality of heads designed to apply different driving pulses to said heat energy generator.

29. A color filter manufacturing apparatus for coloring each of many filter elements partitioned off by many frames by discharging an ink colored in a predetermined color to color each of the filter elements, thereby manufacturing a color filter, comprising:

discharge means for discharging a colored ink onto the substrate;

moving means for moving relative positions of said discharging means and the substrate; and control means for, when each of the filter elements is to be colored, controlling said moving means and said discharge means to shift and discharge a plurality of inks, in a partially overlapping state, to color each of the filter elements such that intervals between ink discharged is decreased at a last stage of a discharging process compared to intervals of ink of preceding discharging stages.

30. The apparatus according to claim 29, wherein said discharge means is an ink-jet head for performing a coloring operation by discharging an ink.

31. The apparatus according to claim 30, wherein said ink-jet head is a head for discharging an ink by using heat energy, said head having a heat energy generator for generating heat energy applied to the ink.

32. A color filter manufacturing apparatus for coloring each of many filter elements partitioned off by many frames by discharging an ink colored in a predetermined color to color each of the filter elements, thereby manufacturing a color filter, comprising:

discharge means for discharging a color ink onto the substrate;

moving means for moving relative positions of said discharging means and the substrate; and control means for, when each of the filter elements is to be colored, controlling said moving means and said discharge means to shift and discharge a plurality of inks, in a partially overlapping state, to color each of the filter elements such that the number of inks discharged in an overlapping state is set in accordance with an amount of the ink discharged.

33. The apparatus according to claim 32, wherein said discharge means is an ink-jet head for performing a coloring operation by discharging an ink.

34. The apparatus according to claim 33, wherein said ink-jet head is a head for discharging an ink by using heat energy, said head having a heat energy generator for generating heat energy applied to the ink.

35. A color filter manufacturing apparatus for coloring each of many filter elements partitioned off by many frames by discharging an ink colored in a predetermined color to color each of the filter elements, thereby manufacturing a color filter, comprising:

discharge means for discharging a colored ink onto the substrate;

moving means for moving relative positions of said discharging means and the substrate; and control means for, when each of the filter elements is to be colored, controlling said moving means and said discharge means to shift and discharge a plurality of inks, in a partially overlapping state, into the frame partitioning off each of the filter elements such that the amounts of inks discharged are set to be different in units of inks.

36. The apparatus according to claim 35, wherein said discharge means is an ink-jet head for performing a coloring operation by discharging an ink.

37. The apparatus according to claim 36, wherein said ink-jet head is a head for discharging an ink by using heat energy, said head having a heat energy generator for generating heat energy applied to the ink.

38. A color filter manufactured by coloring each of many filter elements partitioned off by many frames by discharging an ink colored in a predetermined color to color each of the frames, wherein in coloring each of the filter elements by shifting discharging positions of a plurality of inks so that a part of each ink dot overlaps a part of an adjacent ink dot, a discharging start position of an ink discharged is set to color the filter element while setting an amount of ink discharged at the start position larger than amounts of inks discharged at the positions other than the start position.

39. A color filter manufactured by coloring each of many filter elements partitioned off by many frames by discharging an ink colored in a predetermined color to color each of the filter elements, wherein in coloring each of the filter elements, when a plurality of inks are to be shifted and discharged, in a partially overlapping state, to color each of the filter elements, intervals between inks discharged are decreased at a last stage of a discharging process compared to intervals of ink of preceding discharging stages.

40. A color filter manufactured by coloring each of many filter elements partitioned off by many frames by discharging an ink colored in a predetermined color to color each of the filter elements, wherein in coloring each of the filter elements, when a plurality of inks are to be shifted and discharged, in a partially overlapping state, to color off each of the filter elements, the number of inks to be discharged is set in accordance with an amount of ink discharged.

41. A color filter manufactured by coloring each of many filter elements partitioned off by many frames by discharging an ink colored in a predetermined color to color each of the filter elements, wherein in coloring each of the filter elements, when a plurality of inks are to be shifted and discharged, in a partially overlapping state, to color each of the filter elements, amounts of ink discharged are set to be different in units of inks.

42. A display apparatus using a color filter manufactured by coloring each of many filter elements partitioned off by many frames by discharging an ink colored in a predetermined color to color each of the filter elements, comprising:

display means for displaying an image;

a color filter having filter elements each colored by shifting discharging positions of a plurality of inks so that a part of each ink dot overlaps a part of an adjacent ink dot, such that a discharging start position of an ink discharged is set to set an amount of ink discharged at the start position larger than amounts of inks discharged at the positions other than the start position; and light amount changing means for changing an amount of light.

43. The apparatus according to claim 42, wherein said light amount changing means comprises a liquid crystal compound sealed between said color filter and said substrate which opposes said color filter.

44. A display apparatus using a color filter manufactured by coloring each of many filter elements partitioned off by many frames by discharging an ink colored in a predetermined color to color each of the filter elements, comprising:

display means for displaying an image;

a color filter having filter elements each colored such that when a plurality of inks are to be shifted and discharged, in a partially overlapping state, to color each of the filter elements, intervals between inks discharged in an overlapping state are decreased at a last stage of a discharging process compared to intervals of ink of preceding discharging stages, and light amount changing means for changing an amount of light.

45. The apparatus according to claim 44, wherein said light amount changing means comprises a liquid crystal compound sealed between said color filter and said substrate which opposes said color filter.

46. A display apparatus using a color filter manufactured by coloring each of many filter elements partitioned off by many frames by discharging an ink colored in a predetermined color to color each of the filter elements, comprising:

display means for displaying an image;

a color filter having filter elements each colored such that when a plurality of inks are to be shifted and discharged, in a partially overlapping state, to color each of the filter elements, the number of inks to be discharged in an overlapping state is set in accordance with an amount of ink discharged; and light amount changing means for changing an amount of light.

47. The apparatus according to claim 46, wherein said light amount changing means comprises a liquid crystal compound sealed between said color filter and said substrate which opposes said color filter.

48. A display apparatus using a color filter manufactured by coloring each of many filter elements partitioned off by many frames by discharging an ink colored in a predetermined color to color each of the filter elements, comprising:

display means for displaying an image;

a color filter having filter elements each colored such that when a plurality of inks are to be shifted and discharged, in a partially overlapping state, to color each of the filter elements, amounts of ink discharged in an overlapping state are set to be different in units of inks; and light amount changing means for changing an amount of light.

49. The apparatus according to claim 48, wherein said light amount changing means comprises a liquid crystal compound sealed between said color filter and said substrate which opposes said color filter.

50. An apparatus including a display apparatus having a color filter manufactured by coloring each of many filter elements partitioned off by many frames by discharging an ink colored in a predetermined color to color each of the filter elements, comprising:

a display apparatus incorporating a color filter having filter elements each colored by shifting discharging positions of a plurality of inks so that a part of each ink dot overlaps a part of an adjacent ink dot with a discharging start position of an ink discharged being set to set an amount of ink discharged at the start position larger than amounts of inks discharged at the positions other than the start position, and light amount changing means for changing an amount of light; and image signal output means for outputting an image signal to said display apparatus.

51. The apparatus according to claim 50, wherein said light amount changing means comprises a liquid crystal compound sealed between said color filter and said substrate which opposes said color filter.

52. An apparatus including a display apparatus having a color filter manufactured by coloring each of many filter elements partitioned off by many frames by discharging an ink colored in a predetermined color to color each of the filter elements, comprising:

a display apparatus incorporating a color filter having filter elements each colored such that when a plurality of inks are to be shifted and discharged, in a partially overlapping state, to color each of the filter elements, intervals between inks discharged are decreased at a last stage of a discharging process compared to intervals of ink of preceding stages, and light amount changing means for changing an amount of light; and image signal output means for outputting an image signal to said display apparatus.

53. The apparatus according to claim 52, wherein said light amount changing means comprises a liquid crystal compound sealed between said color filter and said substrate which opposes said color filter.

54. An apparatus including a display apparatus having a color filter manufactured by coloring each of many filter elements partitioned off by many frames by discharging an ink colored in a predetermined color into each of the filter elements, comprising:

a display apparatus incorporating a color filter having filter elements each colored such that when a plurality of inks are to be shifted and discharged, in a partially overlapping state, to color each of the filter elements, the number of inks to be discharged is set in accordance with an amount of ink discharged, and light amount changing means for changing an amount of light; and image signal output means for outputting an image signal to said display apparatus.

55. The apparatus according to claim 54, wherein said light amount changing means comprises a liquid crystal compound sealed between said color filter and said substrate which opposes said color filter.

56. An apparatus including a display apparatus having a color filter manufactured by coloring each of many filter elements partitioned off by many frames by discharging an ink colored in a predetermined color to color each of the filter elements, comprising:

a display apparatus incorporating a color filter having filter elements each colored such that when a plurality of inks to be shifted and discharged, in a partially overlapping state, to color each of the filter elements, amounts of ink discharged are set to be different in units of inks, and light amount changing means for changing an amount of light; and image signal output means for outputting an image signal to said display apparatus.

57. The apparatus according to claim 56, wherein said light amount changing means comprises a liquid crystal compound sealed between said color filter and said substrate which opposes said color filter.

58. A color filter manufacturing method of manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, said method comprising the step of coloring the filter elements arranged in the scanning direction by shifting discharging positions of a plurality of inks so that a part of each ink dot overlaps a part of an adjacent ink dot while an amount of ink discharged at the start position larger than amounts of inks discharged at the start positions other than the start position is set by setting a discharging start position of the ink discharged at the start of the scanning operation.

59. The method according to claim 58, wherein said ink-jet head is a head for discharging an ink by using heat energy, said head having a heat energy generator for generating heat energy applied to the ink.

60. The method according to claim 59, wherein a volume of the ink discharged is controlled by changing a driving pulse applied to said heat energy generator.

61. The method according to claim 58, wherein the filter elements are colored in different colors.

62. A color filter manufacturing method of manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, said method comprising the step of decreasing intervals between ink, discharged in a partially overlapping state, at a last stage of a scanning operation compared to intervals of ink of preceding discharging stages.

63. The method according to claim 62, wherein said ink-jet head is a head for discharging an ink by using heat energy, said head having a heat energy generator for generating heat energy applied to the ink.

64. The method according to claim 63, wherein a volume of the ink discharged is controlled by changing a driving pulse applied to said heat energy generator.

65. The method according to claim 62, wherein the filter elements are colored in different colors.

66. A color filter manufacturing method of manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, said method comprising the step of setting the number of inks, discharged in a partially overlapping state, in accordance with an amount of ink discharged.

67. The method according to claim 66, wherein said ink-jet head is a head for discharging an ink by using heat energy, said head having a heat energy generator for generating heat energy applied to the ink.

68. The method according to claim 67, wherein a volume of the ink discharged is controlled by changing a driving pulse applied to said heat energy generator.

69. The method according to claim 66, wherein the filter elements are colored in different colors.

70. A color filter manufacturing method of manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, said method comprising the step of setting amounts of inks, discharged in a partially overlapping state, to be different in units of inks.

71. The method according to claim 70, wherein said ink-jet head is a head for discharging an ink by using heat energy, said head having a heat energy generator for generating heat energy applied to the ink.

72. The method according to claim 71, wherein a volume of the ink discharged is controlled by changing a driving pulse applied to said heat energy generator.

73. The method according to claim 70, wherein the filter elements are colored in different colors.

74. A color filter manufacturing apparatus for manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

moving means for moving relative positions of said ink-jet head and the substrate; and control means for controlling said moving means and said ink-jet head such that each of the filter elements are colored by shifting discharge positions of a plurality of inks so that a part of each ink dot overlaps a part of an adjacent ink dot, and an amount of ink discharged at the start position larger than amounts of inks discharged at the positions other than the start position is set by setting a discharging start position of the ink discharged at the start of the scanning operation.

75. The apparatus according to claim 74, wherein said ink-jet head is a head for discharging an ink by using heat energy, said head having a heat energy generator for generating heat energy applied to the ink.

76. A color filter manufacturing apparatus for manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

moving means for moving relative positions of said ink-jet head and the substrate; and control means for controlling said moving means and said ink-jet head to decrease intervals between inks, discharged in a partially overlapping state, at a last stage of the scanning operation compared to intervals of ink of preceding discharging stages.

77. The apparatus according to claim 76, wherein said ink-jet head is a head for discharging an ink by using heat energy, said head having a heat energy generator for generating heat energy applied to the ink.

78. A color filter manufacturing apparatus for manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

moving means for moving relative positions of said ink-jet head and the substrate; and control means for controlling said moving means and said ink-jet head to set the number of inks, discharged in a partially overlapping state, in accordance with an amount of ink discharged.

79. The apparatus according to claim 78, wherein said ink-jet head is a head for discharging an ink by using heat energy, said head having a heat energy generator for generating heat energy applied to the ink.

80. A color filter manufacturing apparatus for manufacturing a color filter by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

moving means for moving relative positions of said ink-jet head and the substrate; and control means for controlling said moving means and said ink-jet head to set amounts of inks discharged in a partially overlapping state to be different in units of inks.

81. The apparatus according to claim 80, wherein said ink-jet head is a head for discharging an ink by using heat energy, said head having a heat energy generator for generating heat energy applied to the ink.

82. A color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, wherein the filter elements arranged in the scanning direction are colored by shifting discharging positions of a plurality of inks so that a part of each ink dot overlaps a part of an adjacent ink dot while an amount of ink discharged at the start position larger than amounts of inks discharged at the positions other than the start position is set by setting a discharging start position of the ink discharged into the frame at the start of the scanning operation.

83. A color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, wherein intervals between ink, discharged in a partially overlapping state, are decreased at a last stage of a scanning operation compared to intervals of ink of preceding discharging stages.

84. A color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, wherein the number of inks discharged in a partially overlapping state is set in accordance with an amount of ink discharged.

85. A color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, wherein amounts of inks discharged in a partially overlapping state are set to be different in units of inks.

86. A display apparatus using a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

display means for displaying an image;

a color filter manufactured by coloring filter elements by shifting discharging positions of a plurality of inks so that a part of each ink dot overlaps a part of an adjacent ink dot, said color filter arranged in the scanning direction, while an amount of ink discharged at the start position larger than amounts of inks discharged at the positions other than the start position is set by setting a discharging start position of the ink discharged into the frame at the start of the scanning operation; and light amount changing means for changing an amount of light.

87. A display apparatus using a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

display means for displaying an image;

a color filter colored while intervals between ink, discharged in a partially overlapping state, are decreased at a last stage of a scanning operation compared to intervals of ink of preceding discharging stages; and light amount changing means for changing an amount of light.

88. A display apparatus using a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

display means for displaying an image;

a color filter colored while the number of inks, discharged in a partially overlapping state, is set in accordance with an amount of ink discharged; and light amount changing means for changing an amount of light.

89. A display apparatus using a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

display means for displaying an image;

a color filter colored while amounts of inks, discharged in a partially overlapping state, are set to be different in units of inks; and light amount changing means for changing an amount of light.

90. An apparatus including a display apparatus having a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

a display apparatus incorporating a color filter manufactured by coloring filter elements by shifting discharging positions of a plurality of inks so that a part of each ink dot overlaps a part of an adjacent ink dot, with said color filter arranged in the scanning direction, while an amount of ink discharged at the start position larger than amounts of inks discharged at the positions other than the start position is set by setting a discharging start position of the ink discharged into the frame at the start of the scanning operation, and light amount changing means for changing an amount of light; and image signal output means for outputting an image signal to said display apparatus.

91. An apparatus including a display apparatus having a color filter manufactured by discharging an ink while scanning, with an ink-jet head, a transparent substrate on which many frames for partitioning off many filter elements are formed and continuously coloring portions inside and outside the filter elements arranged in a scanning direction of said ink-jet head, comprising:

a display apparatus incorporating a color filter colored while intervals between ink, discharged in a partially overlapping state, are decreased at a last stage of a scanning operation compared to intervals of ink at preceding stages, and light amount changing means for changing an amount of light; and image signal output means for outputting an image signal to said display apparatus.

92. An apparatus including a display apparatus having a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

a display apparatus incorporating a color filter colored while the number of inks discharged in a partially overlapping state is changed in accordance with an amount of ink discharged, and light amount changing means for changing an amount of light; and image signal output means for outputting an image signal to said display apparatus.

93. An apparatus including a display apparatus having a color filter manufactured by discharging an ink while scanning, with an ink-jet head, a transparent substrate on which many frames for partitioning off many filter elements are formed, and continuously coloring portions inside and outside the filter elements arranged in a scanning direction of said ink-jet head, comprising:

a display apparatus integrally incorporating a color filter colored while amounts of inks discharged in a partially overlapping state are set to be different in units of inks, and light amount changing means for changing an amount of light;

image signal output means for outputting an image signal to said display apparatus.

94. A method of manufacturing a color filter by discharging an ink onto a substrate to perform a coloring operation while relatively scanning the substrate with an ink-jet head and by shifting discharging positions of a plurality of inks so that a part of each ink dot overlaps a part of an adjacent ink dot in a filter element array, said method comprising the step of changing a method of discharging the ink from said ink-jet head for each area in a filter element array which is located on the substrate, including at least one filter element, and extends in a scanning direction so as to equalize color irregularity in the filter element array.

95. The method according to claim 94, wherein said ink-jet head is a head for discharging an ink by using heat energy, said head having a heat energy generator for generating heat energy applied to the ink.

96. A method of equalizing colored states of areas in a filter element array on a substrate in manufacturing a color filter by discharging an ink onto the substrate to perform a coloring operation while relatively scanning the substrate with an ink jet-head and by shifting discharging positions of a plurality of inks so that a part of each ink dot overlaps to a part of an adjacent ink dot in a filter element array, said method comprising the step of changing a method of discharging the ink from said ink-head for each area in a filter element array which is located on the substrate, including at least one filter element, and extends in a scanning direction.

97. The method according to claim 96, wherein said ink-jet head is a head for discharging an ink by using heat energy, said head having a heat energy generator for generating heat energy applied to the ink.

98. A color filter manufacturing method of coloring each of many filter elements partitioned off by many frames formed on a transparent substrate by discharging a plurality of inks onto different positions to color each of the filter elements, thereby manufacturing a color filter, said method comprising the step of, in coloring each of the filter elements, discharging the ink so as to cover both the frame and the filter element at the time when the ink land on the substrate.

99. The method according to claim 98, wherein the amount of the ink discharged so as to cover both the frame and the filter element is greater than that of the other inks discharged onto the same filter element.

100. A color filter manufacturing method of coloring each of many filter elements partitioned off by many frames formed on a transparent substrate by discharging an ink to color each of the filter elements, thereby manufacturing a color filter, said method comprising the step of setting the number of inks to be shifted and discharged, in accordance with an amount of the ink per discharged operation, when a plurality of inks are to be shifted and discharged onto the frame partitioning off each of the filter elements.

101. The method according to claim 100, wherein each of the filter elements is colored by a plurality of inks discharged by different nozzles of an ink-jet head which has a plurality of nozzles.

102. A color filter manufacturing apparatus for coloring each of many filter elements partitioned off by many frames formed on a transparent substrate by discharging a plurality of inks onto different positions to color each of the filter elements, thereby manufacturing a color filter, said apparatus comprising:

discharging means for discharging the ink onto the substrate;

moving means for moving relative positions of said discharge means and the substrate; and discharge control means for controlling a discharge operation so that the ink is discharged to cover both the frame and the filter element at the time when the ink lands on the substrate.

103. The apparatus according to claim 102, wherein the amount of the ink discharged to cover both the frame and the filter element is greater than that of the other inks discharged onto the same filter element.

104. A color filter manufacturing apparatus for coloring each of many filter elements partitioned off by many frames formed on a transparent substrate by discharging an ink to color each of the filter elements, thereby manufacturing a color filter, comprising:

discharge means for discharging the ink onto the substrate;

moving means for moving relative positions of the discharge means and the substrate; and discharge control means for, when each of the filter elements is to be colored, setting the number of inks to be shifted and discharged, in accordance with an amount of the ink per discharge operation, when a plurality of inks are to be shifted and discharged onto the frame partitioning off each of the filter elements.

105. The apparatus according to claim 104, wherein each of the filter elements is colored by a plurality of inks discharged by different nozzles of an ink-jet head, which has a plurality of nozzles, forming part of said discharge means.

106. A color filter manufacturing method of manufacturing a color filter by discharging an ink while scanning, with an ink-jet head, a transparent substrate on which many frames for partitioning off many filter elements are formed, and shifting a discharging position of a plurality of inks, and continuously coloring portions inside and outside the filter elements arranged in a scanning direction of the ink-jet head, said method comprising the step of, in coloring each of the filter elements arranged in the scanning direction, discharging the ink so as to cover both the frame and the filter element at the time when the ink lands on the substrate.

107. The method according to claim 106, wherein the amount of the ink discharged so as to cover both the frame and the filter element is greater than that of the other inks discharged onto the same filter element.

108. A color filter manufacturing method of manufacturing a color filter by discharging an ink while scanning, with an ink-jet head, a transparent substrate on which many frames for partitioning off many filter elements are formed, and shifting a discharging position of a plurality of inks, and continuously coloring portions inside and outside the filter elements arranged in a scanning direction of the ink-jet head, said method comprising the step of setting the number of inks, to be shifted and discharged, in accordance with an amount of the ink per discharge operation.

109. The method according to claim 108, wherein each of the filter elements is colored by a plurality of inks discharged by different nozzles of ink-jet head which has a plurality of nozzles.

110. A color filter manufacturing apparatus for manufacturing a color filter by discharging an ink while scanning, with an ink-jet head, a transparent substrate on which many frames for partitioning off many filter elements are formed, and shifting the discharging position of a plurality of inks, and continuously coloring portions inside and outside the filter elements arranged in a scanning direction of the ink-jet head, said apparatus comprising:

moving means for moving relative positions of the ink-jet head and the substrate; and discharge control means for controlling a discharge operation so that the ink is discharged so as to cover both the frame and the filter element at the time when the ink lands on the substrate.

111. The apparatus according to claim 110, wherein the amount of the ink discharged so as to cover both the frame and the filter element is greater than that of the other inks discharged onto the same filter element.

112. A color filter manufacturing apparatus for manufacturing a color filter by discharging an ink while scanning, with an ink-jet head, a transparent substrate on which many frames for partitioning off many filter elements are formed, and shifting a discharging position of a plurality of inks, and continuously coloring portions inside and outside the filter elements arranged in a scanning direction of the ink-jet head, said apparatus comprising:

moving means for moving relative postions of the ink-jet head and the substrate; and discharge control means for setting the number of inks to be shifted and discharged, in accordance with an amount of the ink per discharge operation, when a plurality of inks are to be shifted and discharged into the frame partitioning off each of the filter elements.

113. The apparatus according to claim 112, wherein each of the filter elements is colored by a plurality of inks discharged by different nozzles of an ink-jet head which has a plurality of nozzles.

114. A color filter manufacturing method of manufacturing a color filter by discharging an ink onto a substrate to form at least one filter element while relatively scanning the substrate with an ink-jet head, said method comprising the step of using a different discharging operation in coloring at least one portion of the filter element from a discharging operation in coloring another portion of the same filter element for reducing coloring unevenness of the filter element.

115. A method of reducing coloring unevenness of a filter element used in manufacturing a color filter by discharging an ink onto a substrate to form at least one filter element while relatively scanning the substrate with an ink-jet head, said method comprising the step of using a different discharging operation in coloring at least one portion of the filter element from a discharging operation in coloring another portion of the same filter element.

116. A color filter manufacturing method of coloring each of a plurality of filter elements partitioned off by frames formed on a transparent substrate, said method comprising the step of:

discharging a plurality of inks onto different positions to color each of the filter elements by scanning the transparent substrate and an ink discharge head relatively in a scanning direction; and in coloring each of the filter elements, discharging the ink so as to cover both the frame and the filter element when the ink lands on the substrate, wherein the plurality of inks are discharged along a boundary between the frame and the filter element in the scanning direction in at least two rows.

* * * * *

UNITED STATES PATENT AND TRADEMARK OFFICE
CERTIFICATE OF CORRECTION

PATENT NO.   : 6,179,400 B1
DATED        : January 30, 2001
INVENTOR(S)  : Makoto Akahira et al.

It is certified that error appears in the above-identified patent and that said Letters Patent is hereby corrected as shown below:

Item [56] References Cited, U.S. PATENT DOCUMENTS,
"5,726,724 3/1998 Shirota, et al." should read -- 5,726,723 3/1998 Shirota, et al. -- and "Avata" should read -- Ayata --.

Column 26,
Line 4, "other" should read -- other than --.

Column 35,
Line 55, "discharged" should read -- discharge --.

Column 36,
Line 1, "discharging" should read -- discharge --.

Signed and Sealed this

Twenty-ninth Day of January, 2002

*Attest:*

*Attesting Officer*

JAMES E. ROGAN
*Director of the United States Patent and Trademark Office*